United States Patent
Watanabe et al.

Patent Number: 5,477,380
Date of Patent: Dec. 19, 1995

[54] PROJECTION SCREEN

[75] Inventors: Hitomu Watanabe; Akira Izawa; Makoto Honda; Satoshi Nakamae; Hiroshi Kojima, all of Shinjuku, Japan

[73] Assignee: Dai Nippon Printing Co., Ltd., Tokyo, Japan

[21] Appl. No.: 260,406

[22] Filed: Jun. 14, 1994

[30] Foreign Application Priority Data

| Jun. 14, 1993 | [JP] | Japan | 5-141692 |
| Jun. 14, 1993 | [JP] | Japan | 5-141693 |
| Jan. 27, 1994 | [JP] | Japan | 6-023555 |
| Jan. 27, 1994 | [JP] | Japan | 6-023556 |
| Feb. 21, 1994 | [JP] | Japan | 6-021751 |

[51] Int. Cl.$^6$ ............................... G03B 21/60
[52] U.S. Cl. ............... 359/457; 359/453; 359/460
[58] Field of Search .................. 359/443, 453–457, 359/460

[56] References Cited

U.S. PATENT DOCUMENTS 4,576,850  3/1986  Martens.
4,961,642  10/1990  Ogino.
5,206,761  4/1993  Ogino.

FOREIGN PATENT DOCUMENTS

| 56-15731 | 2/1981 | Japan. |
| 56-74430 | 6/1981 | Japan. |
| 56-74429 | 6/1981 | Japan. |
| 56-147140 | 11/1981 | Japan. |
| 58-93043 | 6/1983 | Japan. |
| 60-263932 | 12/1985 | Japan. |
| 61-75677 | 4/1986 | Japan. |
| 61-156273 | 7/1986 | Japan. |
| 3-223883 | 10/1991 | Japan. |

*Primary Examiner*—Richard A. Wintercorn
*Attorney, Agent, or Firm*—Oliff & Berridge

[57] ABSTRACT

A projection screen comprises a horizontal refracting linear Fresnel lens sheet, a vertical refracting linear Fresnel lens sheet and a light diffusing lenticular lens sheet, which are arranged from the beam-projection side starting with the horizontal refracting linear Fresnel lens sheet followed by the vertical refracting linear Fresnel lens sheet and ending with the light diffusing lenticular lens sheet.

22 Claims, 23 Drawing Sheets

BRIGHTNESS DISTRIBUTION (3,050 mm)
——— GREEN
----- RED
—·— BLUE

BRIGHTNESS DISTRIBUTION AT THE RIGHT-SIDE UPPERMOST EDGE OF THE SCREEN ($\alpha H = 37°, \alpha V = 7°$)

OBSERVATION DISTANCE : 3,429 mm
HEIGHT : 0 mm

----RED ——GREEN —·—BLUE

OBSERVATION DISTANCE : 3,429 mm
HEIGHT : 343 mm

----RED ——GREEN —·—BLUE

LINEAR FRESNEL ($\alpha V = 6°$)

OBSERVATION DISTANCE : 3,429 mm
HEIGHT : 0 mm

CIRCULAR FRESNEL ($\alpha V=6°$)

OBSERVATION DISTANCE : 3,429 mm
HEIGHT : 343 mm

LINEAR FRESNEL ($\alpha V=6°$)

OBSERVATION DISTANCE : 3,429 mm
HEIGHT : 343 mm

RADIATION-ANGLE TANGENTS
OF THE GREEN BEAM
IN THE ACTUAL EXAMPLE

EXAMPLE FOR COMPARISON 1

EXAMPLE FOR COMPARISON 2

RADIATION-ANGLE TANGENTS OF THE GREEN BEAM IN THE ACTUAL EXAMPLE

EXAMPLE FOR COMPARISON 3

EXAMPLE FOR COMPARISON 4

PROJECTION SCREEN

BACKGROUND OF THE INVENTION

1. Field of the Invention

The present invention relates to a projection screen for rear-projection television sets. In particular, the present invention relates to a projection screen, the configuration of which includes a horizontal refracting linear Fresnel lens sheet and a vertical refracting linear Fresnel lens sheet, wherein a ridge line of said horizontal refracting linear Fresnel lens sheet extends in said vertical direction and a ridge line of said vertical refracting linear Fresnel lens sheet extends in said horizontal direction.

2. Description of the Prior Art

A projection screen for rear-projection TV sets comprises a Fresnel lens unit for converging a projection beam to the watching side and a lenticular unit for dispersing the projection beam and forming a picture. The Fresnel lens unit and the lenticular unit can be formed into one or two sheets which are referred to as a single-screen type and a double-screen type respectively. Most of the home TV sets are of the latter type.

A circular Fresnel lens sheet comprises circular unit lenses which are laid out on a plurality of planes in such a way that their ridge lines form concentric circles. Having such a configuration, the circular Fresnel lens sheet produces an effect of converging the projection beam to the watching side. The lenticular lens sheet, on the other hand, comprises linear unit lenses which are laid out on a plurality of planes in such a way that their ridge lines are parallel to each other. Having such a configuration, the lenticular lens sheet produces an effect of dispersing the projection beam and forming a picture.

The projection screen described above, be it of the single-screen type or of the double-screen type, has its Fresnel lenses formed into a concentric shape. A metal pattern used for manufacturing concentric Fresnel lens sheets is trimmed into a rotary disc.

A circular Fresnel lens is manufactured by using a plane forming pattern, the metal pattern trimmed into a rotary disc cited above. The circular Fresnel lens is fabricated by adopting methods such as a 'press technique' a 'cast technique' and a 'UV' technique. In the press technique, a transparent resin plane is pressed against a heated metal pattern. In the cast technique, transparent resin undergoes thermal polymerization inside a metal-pattern cell. In the UV technique, a metal pattern is coated with ultraviolet-ray hardened resin and a transparent resin plane is then placed as a cover on the ultraviolet-ray hardened resin. Finally, an ultraviolet ray is applied thereto for hardening the resin.

In either method, however, circular Fresnel lens sheets must be produced one by one in order to create a circular form. As a result, the producibility is poor and it is difficult to reduce the production cost in comparison to the lenticular lens sheet to which continuous production by means of the press technique can be applied.

In addition, the optical dispersion characteristic of a lenticular lens sheet used in the projection screen is normally wide in the horizontal direction but narrow in the vertical direction. It is thus desirable to use the optical system of the screen as a converging system in the vertical direction but for producing parallelly radiated rays in the horizontal direction. When a circular Fresnel lens sheet is used, however, the lenses are created into a concentric form. Accordingly, it is impossible to set optical systems in the vertical and horizontal directions independently of each other. As a result, the optical system is generally used as a converging system also in the horizontal direction by adjusting it to the vertical direction which has a small diffusion angle. Furthermore, as disclosed in Japanese Patent Laid-open Nos. S56-147140 and S61-75677, a circular Fresnel lens sheet in use may be a lens sheet in which the focal distance is changed as the lens is located away from the center toward the peripheral. In this case, none the less, the focus distance varies within the range of the converging system.

As disclosed in Japanese Patent Laid-open Nos. S56-74429 and S56-74430, on the other hand, the use of two overlapping linear Fresnel lens sheets with their lines perpendicular to each other is proposed as a substitute for the concentric circular Fresnel lenses wherein each linear Fresnel lens sheet is formed with its Fresnel lenses overlapped in parallel in one direction.

In the case of such linear Fresnel lenses, the metal pattern for creating a linear Fresnel lens can be formed by directly trimming the metal pattern into a roll.

When Fresnel lenses are employed, a Fresnel lens can be created by using a roll-shaped forming mold as described above. Accordingly, Fresnel lenses can be produced continuously by creating Fresnel lenses through extrusion of thermoplastic resin or the use of resin hardened by an ultraviolet ray. As a result, it is possible to enhance the production efficiency and to reduce the production cost.

When linear Fresnel lenses are used in a configuration wherein they cross each other, however, the number of lens sheets is incremented by one in comparison to the case of circular Fresnel lenses. The increased number of linear Fresnel lens sheets reduces the gain. In addition, in the case of circular Fresnel lenses, the vertical/horizontal outgoing radiation angles on the same horizontal/vertical coordinates are equal to each other. In the case of such linear Fresnel lenses, on the other hand, these angles are not equal to each other, giving rise to a problem of deteriorated picture qualities.

In addition, linear Fresnel lenses crossing each other can be used in the vertical and horizontal directions or by letting the lenses cross each other in a slanting direction at a lens angle of 45 degrees. In the case of the 45 degree inclination, a problem of a high material cost is encountered even if the linear Fresnel lens is formed by the press technique.

On the other hand, a lenticular lens is created for diverging light in a direction perpendicular to the surface of either of the lens sheets which constitute a projection screen as disclosed in Japanese Patent Laid-open Nos. S58-93043 and S60-263932. By bearing part of the function of diverging the light in the perpendicular direction in this way, the amount of a light-diffusing material to be mixed in the lenticular lens sheet can be reduced. As a result, the loss of the projection beam can also be decreased as well.

In the configuration described, however, the vertical/horizontal outgoing radiation angles on the same horizontal/vertical coordinates are not made equal to each other. Accordingly, luminance as well as chrominance variations are prone to appear. As a result, the proposed configuration does not solve the problem that the picture quality deteriorates.

In a projection screen, part of the projected beam is generally reflected by the surface of the lens, becoming a stray beam traveling inside the sheet. The stray beam gives rise to picture interference such as overlapping structures and a rainbow.

In the case of an optical system employing linear Fresnel lenses as described above, in particular, the stray beam forms a white band which expands in the horizontal direction. This white band is observed more strikingly than a rainbow of a circular Fresnel lens, giving rise to a problem of undesirable picture observation.

SUMMARY OF THE INVENTION

The present invention addresses the conventional problems described above. It is an object of the present invention to provide a projection screen with little deterioration in picture quality due to unequal vertical/horizontal outgoing radiation angles on the same horizontal/vertical coordinates and a small reduction in gain even if the linear Fresnel lens sheets are laid out in the horizontal and vertical directions.

In other words, it is an object of the present invention to eliminate the shortcomings of the linear Fresnel lens sheets described above. To be more specific, it is an object of the present invention to provide good pictures on a projection screen, which employs linear Fresnel lens sheets for the refraction of projection beams in the horizontal and vertical directions, by reducing differences in shading, RGB reflection loss and reflection loss.

As mentioned earlier, the present invention addresses the conventional problems described above. It is still another object of the present invention to provide a projection screen with a reduced white band in the horizontal direction even if the linear Fresnel lens sheets are laid out in the horizontal and vertical directions.

When a combination of a horizontal refracting linear Fresnel lens sheet and a vertical refracting linear Fresnel lens sheet is employed, the longer the distance from a circumference to the center, the more inward the beam radiated from the circumference on the combined linear Fresnel lens sheets is directed. On top of that, with the vertical refracting linear Fresnel lens sheet placed on the beam-projection side, the degree to which the beam is directed inward is higher in the vertical direction. With the horizontal refracting linear Fresnel lens sheet placed on the beam-projection side, however, the degree to which the beam is directed inward is higher in the horizontal direction. On the other hand, a lenticular lens sheet, a beam diverging sheet, is installed with the longitudinal direction of its lenticular lenses put straight up so that the angle of diffusion in the horizontal direction is overwhelmingly greater than that in the vertical direction. As a result, the variance of the radiation angle of the beam on the screen has a greater tolerance margin in the horizontal direction.

The present invention provides a projection screen for rear-projection TV sets characterized in that said projection screen comprises three or more screen sheets: a horizontal refracting linear Fresnel lens sheet for refracting a projection beam mainly in a horizontal direction wherein a ridge line of said horizontal refracting linear Fresnel lens sheet extends in a vertical direction, a vertical refracting linear Fresnel lens sheet for refracting a projection beam mainly in said vertical direction wherein a ridge line of said vertical refracting linear Fresnel lens sheet extends in said horizontal direction, and a light diffusing lenticular lens sheet, which are arranged starting from a beam-projection side with said horizontal refracting linear Fresnel lens sheet followed by said vertical refracting linear Fresnel lens sheet and ending with said light diffusing lenticular lens sheet. According to the present invention, the horizontal refracting linear Fresnel lens sheet is placed on the beam-projection side. As a result, the variance of the angle of radiation in the horizontal direction is reduced by the lenticular lens sheet, providing an improved picture quality, one of the objects of the present invention described earlier.

When the horizontal and vertical refracting linear Fresnel lens sheets are employed in a configuration wherein they cross each other perpendicularly, the two lens sheets perform optical-axis compensation. Accordingly, more reflection loss than that of a single circular Fresnel lens sheet is incurred. In accordance with the present invention, however, at least one Fresnel lens unit of either the horizontal or vertical refracting linear Fresnel lens sheet can be created from ultraviolet-ray hardened resin. By creating the Fresnel lens unit from ultraviolet-ray hardened resin on a base material using an ultraviolet-ray hardening technique, the refraction index of the base material can thus be made smaller than that of the Fresnel lens unit. As a result, the increase in reflection loss can be reduced. A press-fabrication technique of thermoplastics resin using a roll-shaped forming mold and a fabrication technique using ultraviolet-ray hardened resin can be considered as methods of creating a linear Fresnel lens sheet. Taking the viscosity of the material resin into consideration, the ultraviolet-ray hardening technique is regarded as a method more desirable than the press-fabrication technique due to the fact that the reproducibility of the mold of the former is better.

As an alternative, a Fresnel lens unit can be created on a base material.

When creating a linear Fresnel lens sheet by means of the ultraviolet-ray hardening technique using a roll-shaped forming mold in accordance with the present invention, a flexible film can be used as a base material. Accordingly, the linear Fresnel lens sheet can be created by putting it in a wound state around the roll for a long time. As a result, the reproducibility of the mold is better than a technique wherein a rigid plane substance is used as a base material and, in addition, the sheet can be round up on a reel after the formation, making the transportation afterward easy to carry out.

According to the present invention, a fourth sheet for enhancing the mechanical strength of the aforementioned three sheets can also be placed at a position closest to the watcher's side. In this case, a reflection preventing film, electric-charge prevention processing, a hard coating material or the like can be applied to the fourth sheet.

According to the above invention, a rigid transparent resin plate or the like is placed at a position closest to the observer's side. As a result, the decrease in mechanical strength, which is resulted in on the screen when a filmy linear Fresnel lens sheet is used, can be compensated for.

Furthermore, having a width-to-height ratio of 4/3 or 16/9, the screen of an ordinary TV set is long from side to side. Accordingly, the horizontal refracting linear Fresnel lens sheet has beam refraction angles on edge portions of the screen sheet greater than those of the vertical refracting linear Fresnel lens sheet. For a small angle of refraction, in general, the smaller the refraction index, the smaller the reflection power. In the case of a big angle of refraction, on the other hand, the greater the refraction index, the smaller the reflection power.

On top of that, by employing the horizontal refracting linear Fresnel lens sheet with a high refraction index and the vertical refracting linear Fresnel lens sheet with a small refraction index to serve respectively as first and second sheets when viewed from the beam projection side in accordance with the present invention, the refraction loss can be reduced to produce a brighter radiation beam.

In addition, the lens angle of the edge of the horizontal refracting linear Fresnel lens sheet becomes greater than that of the edge of the vertical refracting linear Fresnel lens sheet. By increasing the refraction index of the horizontal refracting linear Fresnel lens sheet, however, the lens angle can be made smaller. As a result, the lens can be formed more easily.

In addition, according to the present invention, the focal distance of the horizontal refracting linear lens sheet cited above is made greater than that of the vertical refracting linear lens sheet to match the lenticular lens sheet which has a big angle of diffusion in the horizontal direction. In this way, the tendency of inward directing the radiation beam in the horizontal direction can be relieved particularly, allowing the luminance on the circumference to be improved.

In order to achieve the objects of the present invention described above, the present invention provides a projection screen wherein said horizontal refracting linear Fresnel lens sheet forms a diverging system on an optical axis thereof.

In order to achieve the objects of the present invention described above, the present invention provides said aforementioned projection screen characterized in that the radiation angle in the horizontal direction of a beam passing through both said vertical refracting linear Fresnel lens sheet and said horizontal refracting linear Fresnel lens sheet is divergent on an axis, where a lens angle of said horizontal-direction refracting linear Fresnel lens sheet is zero, and convergent on at least one of the uppermost and lowermost portions of said projection screen where a lens angle of said vertical direction refracting linear Fresnel lens sheet has a maximum value.

In this case, a diverging system may be formed on the horizontal axis including the center of the projection screen. If the diverging system is a weak divergence system with a point of convergence having a sufficient distance at the rear of the projection screen, at either or both of the uppermost and lowermost portions of the projection screen, the radiated rays are converged, resulting in a nearly parallel optical system over the entire area of the projection screen.

In addition, shading can be reduced by forming a converging system on the vertical axis.

In the case of a projection screen employing horizontal and vertical linear Fresnel lens sheets, a beam radiated from the linear Fresnel lens sheet inward due to the internal non-linearity in accordance with Snell's law; the longer the distance from the beam from the central axis, the more inward the beam is directed. At the diagonal edges of the projection screen, radiated beams are thus converged even if radiated beams on the horizontal and vertical axes passing through the center of the screen are made parallel to each other.

It is therefore desirable to make the convergence distances on the horizontal and vertical axes passing through the center of the projection screen large in comparison to the circular Fresnel lens sheet employed in the same TV set when designing the optical system of linear Fresnel lens sheets constituting a projection screen provided by the present invention. With respect to the horizontal direction, in particular, the diffusion angle of the lenticular lens sheet is big in the horizontal direction but small in the vertical direction, resulting in a parallel or weak divergence system which is desirable for reducing the reflection loss incurred on the surface of the lens.

In order to achieve the objects of the present invention described above, the present invention provides a projection screen in which focal distances of said horizontal refracting linear Fresnel lens sheet and said vertical refracting linear Fresnel lens sheet are set at such values that, the greater the distance from a point to the center axis of its lens, the greater the focal distance at the position.

In order to achieve the objects of the present invention described above, the present invention provides said above projection screen further characterized in that said vertical-direction refracting linear Fresnel lens sheet forms a converging system over its entire region, from the center to the outermost circumference thereof, whereas said horizontal-direction refracting linear Fresnel lens sheet forms a converging system only in an area in close proximity to the center thereof. In addition, said horizontal-direction refracting linear Fresnel lens sheet forms a portion converting radiated beams into parallel rays in a range of distances from the center of the lenses to circumferences thereof between a vertical-direction maximum center distance and a horizontal-direction maximum center distance of said horizontal-direction refracting linear Fresnel lens sheet. Furthermore, said horizontal-direction refracting linear Fresnel lens sheet forms a diverging system in circumferences outside said portion.

In this case, a diverging system may be formed at the uppermost portion on the horizontal axis including the center of the projection screen. If the diverging system is a weak divergence system with a point of convergence having a sufficient distance at the rear of the projection screen, at either or both of the uppermost and lowermost portions of the projection screen, the radiated rays are converged, resulting in a nearly parallel optical system over the entire area of the projection screen.

In addition, all areas on the horizontal axis remain as a light converging system with a variable focal distance, allowing shading to be reduced.

In the case of a projection screen employing horizontal and vertical refracting linear Fresnel lens sheets as described before, the longer the distance from the beam to the center, the more inward the beam projected from the linear refracting Fresnel lens sheets is directed. On top of that, with the horizontal refracting linear Fresnel lens sheet placed on the beam-projection side, the degree to which the beam is converged inward is higher in the horizontal direction. With the vertical refracting linear Fresnel lens sheet placed on the beam-projection side, however, the degree to which the beam is converged inward is higher in the vertical direction. On the other hand, the lenticular lens sheet, a light diffusing sheet employed in the projection screen, has a tolerance margin in the horizontal direction overwhelmingly greater than that in the vertical direction. In the present invention, the horizontal refracting linear Fresnel lens sheet is therefore placed on the beam-projection side.

In order to achieve the objects of the present invention described above, the present invention provides said above projection screen further characterized in that said vertical-direction refracting linear Fresnel lens sheet comprises an optical system common to a portion including at least the center of said horizontal-direction refracting linear Fresnel lens sheet.

When a beam projected by a projector hits a smooth-surface side of a Fresnel lens, the beam is refracted and radiated by a lens-formation side of the lens. Part of the beam is reflected on the boundary surface between the lens and the air and returned to the inside of the lens sheet to become a stray beam. Inside the lens sheet, the stray beam is reflected once to several times before most of the stray beam is radiated to the watching side. In the case of a circular Fresnel lens, the radiated stray beam is generally observed as a rainbow. In the case of a linear Fresnel lens, on the other hand, the radiated stray beam is observed as a white band.

When a combination of horizontal and vertical refracting linear Fresnel lens sheets described above is employed, a white band extending in the vertical direction attributed to the horizontal refracting linear Fresnel lens is not observed while a white band extending in the horizontal direction attributed to the vertical refracting linear Fresnel lens is clearly observed. This is because the light diffusing characteristic of the projection screen is set widely and narrowly in the horizontal and vertical directions respectively.

In order to achieve the objects of the present invention described above, the present invention provides a projection screen characterized in that a light diffusing means is provided on said vertical refracting linear Fresnel lens sheet.

By providing the light diffusing means on the linear Fresnel lens sheet for refracting a projection beam in the vertical direction in accordance with the present invention, a white band attributed to a vertical refracting linear Fresnel lens can be effectively eliminated.

In order to achieve the objects of the present invention described above, a sheet created by forming lenses made of ultraviolet-ray hardened resin on a base film is used as said vertical refracting linear Fresnel lens sheet.

In addition, in order to achieve the objects of the present invention described above, a mat-processed surface applied on the beam-incidence surface of said base film is used as said light diffusing means.

In addition, according to the present invention, a mat-processed surface applied on the boundary between said base film and said ultraviolet-ray hardened resin can be used as said light diffusing means.

In addition, according to the present invention, said light diffusing means can be created by including a light-diffusing substance in said base film.

In addition, according to the present invention, said light diffusing means can be made of a light diffusing film laminated on said base film.

In addition, according to the present invention, said light diffusing means can be made of a light diffusing layer coated on the front surface of said base film.

In addition, according to the present invention, said light diffusing means can be made of a combination of two or more of the following: said mat-processed surface applied on the beam-incidence surface of said base film; a mat-processed surface applied on the boundary between said base film and said ultraviolet-ray hardened resin; said material made by including a light-diffusing substance in said base film; said light diffusing film laminated on said base film; and said light diffusing layer coated on the front surface of said base film.

In order to achieve the objects of the present invention described above, the present invention proposes a projection screen made by providing a microlenticular lens on the beam-incidence surface of said vertical-direction refracting linear Fresnel lenses. To be more specific, the microlenticular lens is placed on the beam-incidence-surface side of said vertical-direction linear refracting lens sheet in parallel to a group of linear Fresnel lenses. With the microlenticular lens placed on the beam-incidence surface of linear Fresnel lenses, a stray light beam is diffused in the linear Fresnel lens sheet. In this way, the stray light beam can be prevented from being observed as a white band.

In order to achieve the objects of the present invention, the present invention provides the projection screen further characterized in that the refraction index of said microlenticular lens is made equal or lower than that of said base film of said sheet.

Results of an analysis carried out by the patent inventor indicate that, when a combination of a horizontal refracting linear Fresnel lens sheet and a vertical refracting linear Fresnel lens sheet is employed, the longer the distance from a circumference to the center, the more inward the beam radiated from the circumference on combined linear Fresnel lens sheets is directed. It has been discovered that, as a result, when the user is watching projected pictures at a location close to the screen, portions above and beneath the center of the screen are darkest, producing four relatively bright corners. When the user is watching projected pictures at a location far away from the screen, inversely, the four corners become abruptly dark.

On the other hand, a light diffusing sheet such as the lenticular lens sheet employed in a projection screen has an angle of diffusion in the horizontal direction overwhelmingly greater than that in the vertical direction. It has been discovered that, as a result, the variance of the radiation angle of the beam on the screen has a greater tolerance margin in the horizontal direction.

The objects of the present invention can be achieved by providing a projection screen vertical-direction diffusion angles are set at such values that, the greater the distance from a point to a center of said projection screen, the greater said vertical-direction diffusion angle at said point.

By manufacturing the projection screen in such a way, that the longer the distance from a point to the center of the screen, the greater the angle of diffusion in the vertical direction at the point, the decrease in gain and the deterioration of the picture quality due to unequal vertical/horizontal outgoing radiation angles on the same horizontal/vertical coordinates can be reduced.

In addition, according to the present invention, a microlenticular lens for diverging a beam in the vertical direction is created on the beam-incidence-surface side of either the vertical refracting linear Fresnel lens sheet or the horizontal refracting linear Fresnel lens sheet in such a way that, the longer the distance from a point to the center of the screen, the greater the angle of diffusion in the vertical direction of the microlenticular lens at the point in order to achieve the objects described above.

On top of that, a means is provided according to the present invention for varying the angle of diffusion at a point on the screen as a function of vertical distance from the point to the center of the screen. The means allows the angle of diffusion to be adjusted in a manner easier than a technique of varying the angle of diffusion through the control of the added light-diffusing material. At the same time, the means also allows the decrease in gain as well as the number of blurs on the picture to be reduced. Furthermore, the adjustment of only the angle of diffusion in the vertical direction is easy to carry out in comparison to a technique of adjusting the angle of diffusion of a fly-eye lens provided on the beam-incidence-surface side of the beam diverging lens sheet.

DESCRIPTION OF THE PREFERRED EMBODIMENTS

The present invention will become apparent from the following description of preferred embodiments with reference to accompanying diagrams.

Figure 1:
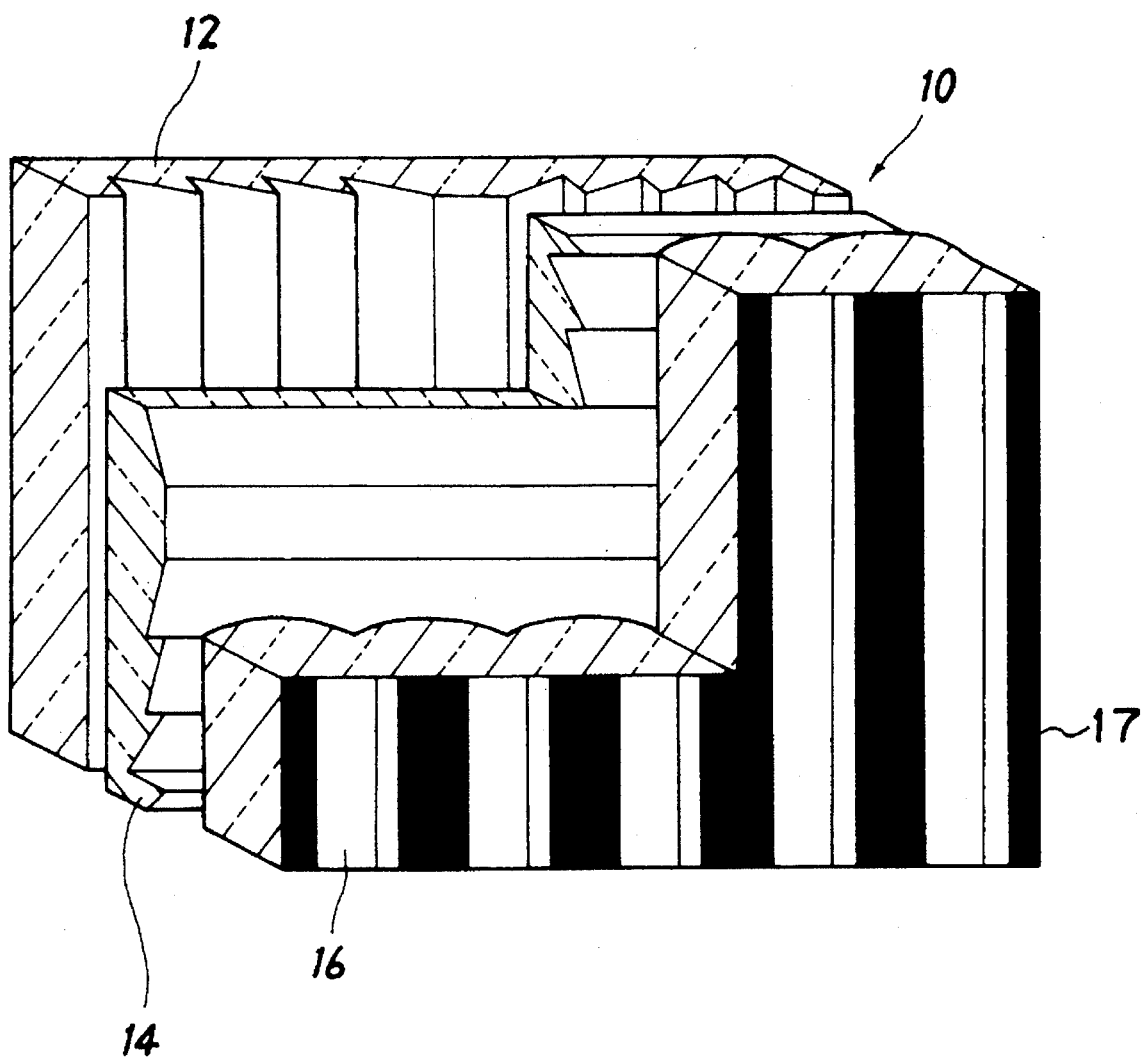
FIG. 1 is a diagram showing a squint view of some cross sections of principal elements of an embodiment implementing an HVL-typed projection screen in accordance with the present invention.

FIG. 1 is a diagram showing a squint view of some cross sections of principal elements of an embodiment implementing an HVL-typed projection screen 10 for rear-projection TV sets in accordance with the present invention. As shown in the figure, the projection screen 10 comprises a horizontal refracting linear Fresnel lens sheet 12, a vertical refracting linear Fresnel lens sheet 14 and a light diffusing lenticular lens sheet 16, which are arranged starting from the beam-projection side with the horizontal refracting linear Fresnel lens sheet 12 followed by the vertical refracting linear Fresnel lens sheet 14 and ending with the light diffusing lenticular lens sheet 16. Reference numeral 17 is a beam absorbing layer. Said horizontal refracting linear Fresnel lens sheet is for refracting a projection beam mainly in a horizontal direction, and has a ridge line extending in said vertical direction, and said vertical refracting linear Fresnel lens sheet 14 is for refracting a projection beam mainly in a vertical direction and has a ridge line extending in said horizontal direction.

Figure 2:
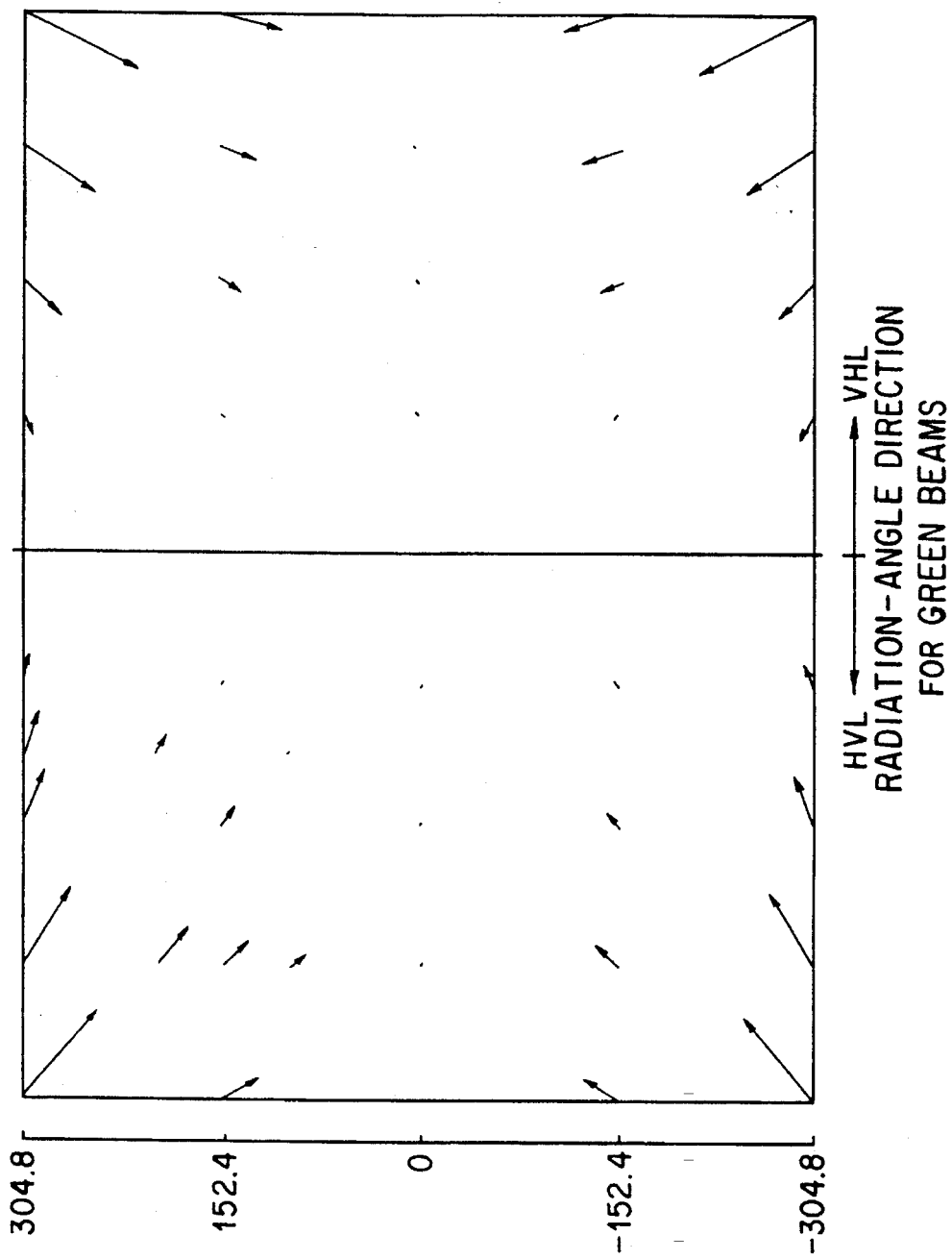
FIG. 2 is a diagram comparing the angle of radiation of the embodiment for the HVL-typed projection screen to the angle of radiation of an VHL-typed projection screen.

In the case of the projection screen 10 implemented by the embodiment of FIG. 1 with an NTSC screen size of 40 inches, a projection distance of 800 mm, infinite distances of convergence on horizontal/vertical axes passing through the center of the screen and a projector convergence angle of 9.5 degrees, green beams pass through the horizontal refracting linear Fresnel lens sheet 12 and the vertical refracting linear Fresnel lens sheet 14 with radiation angles shown on the left half of FIG. 2. The beam diverging lenticular lens sheet 16 has a vertical-diffusion half-value angle of 7 degrees and a horizontal-diffusion half-value angle of 37 degrees.

A VHL-typed projection screen has a vertical refracting linear Fresnel lens sheet placed on the beam-projection side followed by a horizontal refracting linear Fresnel lens sheet. The radiation angles of the VHL-typed projection screen are shown on the right half of FIG. 2. Comparing the HVL-typed projection screen 10 provided by the present invention to that of the VHL type, it becomes obvious that the inwardness of the radiation angle of the beam radiated by the former projection screen 10 is reduced.

Figure 3:
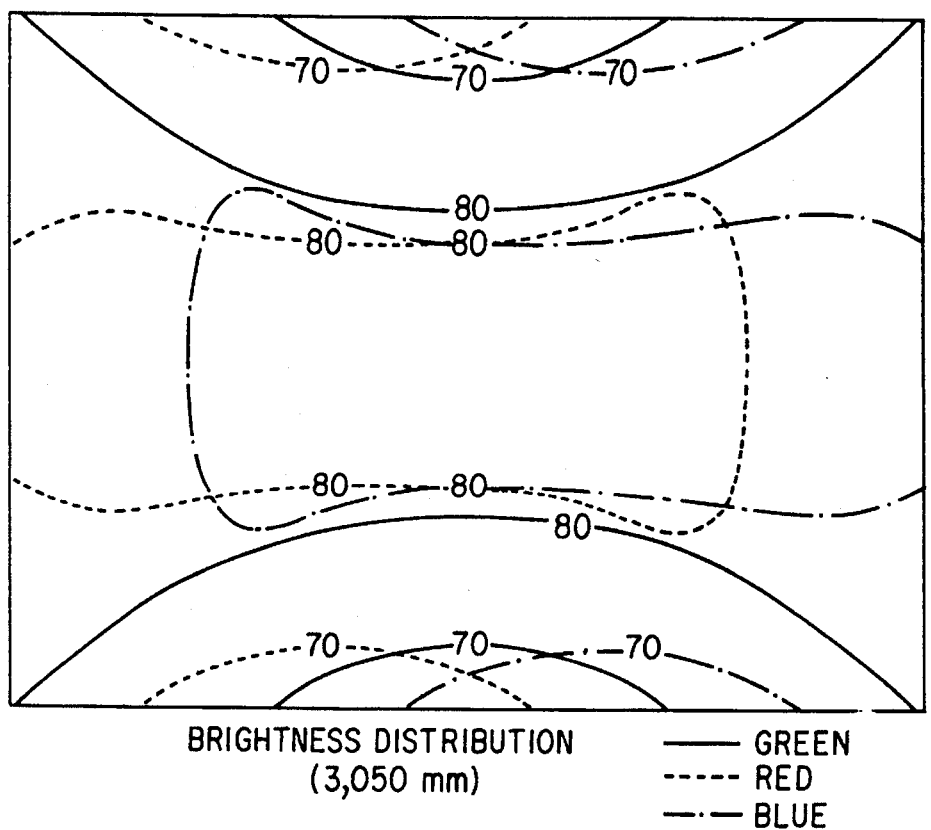
FIG. 3 is a diagram showing distribution of brightness on the embodiment for the projection screen.

A diagram showing distribution of brightness on the entire screen of the embodiment for the projection screen 10 with an observation distance of 3,050 mm, a value five times the height of the screen, is shown in FIG. 3.

Figure 4:
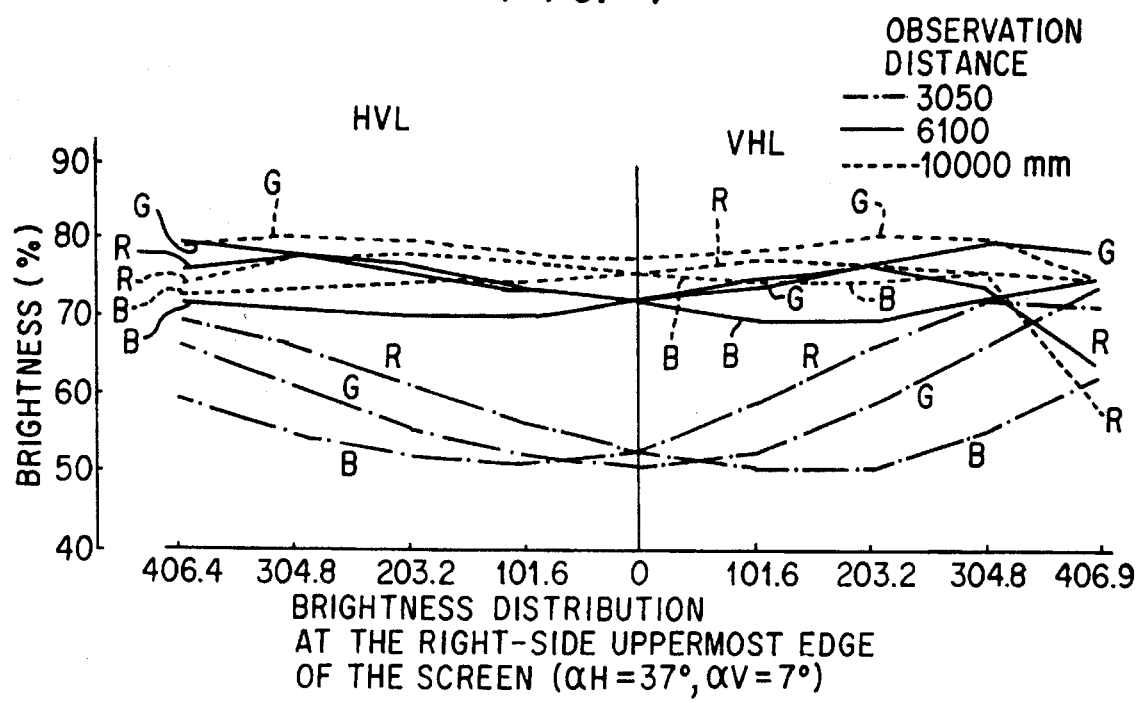
FIG. 4 is a diagram comparing the distribution of brightness on the uppermost level on the right side of the screen of the embodiment for the HVL-typed projection screen to that of the VHL-typed projection screen.

A diagram comparing the relative brightness on the uppermost level of the screen of the embodiment for the HVL-typed projection screen 10 to that of the VHL-typed projection screen is shown in FIG. 4. The former is shown on the left half of the figure whereas the latter is shown on the right half. It should be noted that the brightness shown in the figure is quantities which are obtained when the brightness of radiated light seen from a point on its line of radiation is set at a value equal to (100-reflection-loss rate) %.

From the results shown in FIGS. 2 and 4, it is obvious that the embodiment for the HVL-typed projection screen 10 has better angles of radiation and more excellent distribution of brightness than those of the VHL-typed projection screen.

Next, results of measurement for the HVL-typed projection screen 10 described above are shown in Table 1. The results were obtained with the conditions such as the horizontal-direction convergence distance, the vertical-direction convergence distance as well as the refraction indexes of the horizontal refracting linear Fresnel lens sheet 12 and the vertical refracting linear Fresnel lens sheet 14 modified.

TABLE 1

Design of Linear Fresnel
| | | | | | |
|---|---|---|---|---|---|
| Screen Size | 40 | Aspect Type | NTSC | | |
| Focus 1 | 800 | PJ Distance | 800 | | |
| Center Shift | 0 | CRT Height | 0 | | |
| CRT Angle | 9.5 | Y. Position | 304.8 | | |
| Yiever Distance | 3050 | Yiever Angle | 0.10 | | |

| | | R | | | | G | | | B | | | |
|---|---|---|---|---|---|---|---|---|---|---|---|---|
| Horizontal axis | | Radiation angle (degrees) | | Reflection-loss rate | Brightness | Radiation angle (degrees) | | Reflection-loss rate | Brightness | Radiation angle (degrees) | | Reflection-loss rate | Brightness | RGB average |
| | | H | V | | | H | V | | | H | V | | | | n:(1.55<UY>/1.55<UY>) H Focus 2:10000 Y.Focus 2:10000

| | | H | V | loss rate | ness | H | V | loss rate | ness | H | V | loss rate | ness | age |
|---|---|---|---|---|---|---|---|---|---|---|---|---|---|---|
| ① | 0 | 0.00 | 8.89 | −2.25 | 16.73 | 68.33 | 0 | −1.75 | 16.61 | 66.92 | −8.89 | −2.25 | 16.73 | 68.33 | |
| | 101.6 | 0.03 | 7.24 | −2.78 | 16.75 | 71.52 | −1.4 | −1.92 | 16.67 | 68.11 | −10.7 | −2.06 | 16.9 | 66.95 | |
| | 203.2 | 0.07 | 5.73 | −3.57 | 16.92 | 75.29 | −2.78 | −2.43 | 16.95 | 71.40 | −12.7 | −2.26 | 17.64 | 67.65 | |
| | 304.8 | 0.10 | 4.32 | −4.55 | 17.33 | 78.10 | −4.12 | −3.23 | 17.72 | 75.42 | −14.91 | −2.84 | 19.78 | 69.23 | |
| | 406.4 | 0.13 | 3 | −5.64 | 18.16 | 78.42 | −5.43 | −4.24 | 19.28 | 78.19 | −17.44 | −3.82 | 24.81 | 68.95 | 75.19 | n:(1.55<UY>/1.49) H Focus 2:10000 Y.Focus 2:10000

| ② | 0 | 0.00 | 8.89 | −2.27 | 16.24 | 68.87 | 0 | −1.75 | 16.1 | 67.33 | −8.89 | −2.27 | 16.24 | 68.87 | |
| | 101.6 | 0.03 | 7.24 | −2.81 | 16.27 | 72.11 | −1.4 | −1.93 | 16.16 | 68.60 | −10.7 | −2.08 | 16.41 | 67.49 | |
| | 203.2 | 0.07 | 5.73 | −3.63 | 16.46 | 75.97 | −2.78 | −2.46 | 16.46 | 72.02 | −12.7 | −2.28 | 17.17 | 68.17 | |
| | 304.8 | 0.10 | 4.32 | −4.64 | 16.9 | 78.72 | −4.12 | −3.28 | 17.25 | 76.12 | −14.91 | −2.88 | 19.35 | 69.82 | |
| | 406.4 | 0.13 | 3 | −5.78 | 17.78 | 78.78 | −5.43 | −4.32 | 18.86 | 78.84 | −17.44 | −3.9 | 24.44 | 69.57 | 75.73 | n:(1.49/1.55<UY>) H Focus2:10000 Y.Focus2:10000

| ③ | 0 | 0.00 | 8.89 | −2.25 | 16.01 | 68.92 | 0 | −1.75 | 15.9 | 67.49 | −8.89 | −2.25 | 16.01 | 68.92 | |
| | 101.6 | 0.03 | 7.26 | −2.78 | 16.04 | 72.12 | −1.42 | −1.92 | 15.96 | 68.69 | −10.77 | −2.07 | 16.21 | 67.55 | |
| | 203.2 | 0.07 | 5.81 | −3.57 | 16.23 | 75.87 | −2.83 | −2.43 | 16.32 | 71.94 | −12.96 | −2.27 | 17.18 | 67.97 | |
| | 304.8 | 0.10 | 4.49 | −4.55 | 16.75 | 78.54 | −4.22 | −3.23 | 17.34 | 75.78 | −15.6 | −2.9 | 20.33 | 68.73 | |
| | 406.4 | 0.13 | 3.27 | −5.64 | 17.81 | 78.58 | −5.62 | −4.25 | 19.54 | 77.99 | −19.12 | −4.01 | 29.12 | 64.71 | 73.76 | n:(1.55<UY>/1.55<UY>) H Focus 2:10000 Y.Focus 2:∞

| ④ | 0 | 0.00 | 8.89 | −0.46 | 16.52 | 54.97 | 0 | 0 | 16.43 | 52.79 | −8.89 | −0.46 | 16.52 | 54.97 | |
| | 101.6 | 0.03 | 7.24 | −0.97 | 16.54 | 58.96 | −1.4 | −0.17 | 16.48 | 54.20 | −10.7 | −0.26 | 16.69 | 53.26 | |
| | 203.2 | 0.07 | 5.72 | −1.74 | 16.68 | 64.53 | −2.78 | −0.66 | 16.75 | 58.13 | −12.69 | −0.42 | 17.42 | 54.06 | |
| | 304.8 | 0.10 | 4.31 | −2.69 | 17.08 | 70.25 | −4.12 | −1.42 | 17.5 | 63.65 | −14.89 | −0.96 | 19.54 | 56.75 | |
| | 406.4 | 0.13 | 2.99 | −3.74 | 17.88 | 74.54 | −5.42 | −2.39 | 19.04 | 69.25 | −17.41 | −1.86 | 24.54 | 59.09 | 67.63 | n:(1.55<UY>/1.55<UY>) H Focus 2:∞ Y.Focus 2:10000

| ⑤ | 0 | 0.00 | 8.89 | −2.25 | 16.73 | 68.33 | 0 | −1.75 | 16.61 | 66.92 | −8.89 | −2.25 | 16.73 | 68.33 | |
| | 101.6 | 0.03 | 7.83 | −2.8 | 16.76 | 71.32 | −0.79 | −1.92 | 16.66 | 68.10 | −10.03 | −2.03 | 16.85 | 67.08 | |
| | 203.2 | 0.07 | 6.84 | −3.61 | 16.9 | 74.83 | −1.54 | −2.42 | 16.86 | 71.30 | −11.2 | −2.16 | 17.35 | 67.85 | |

TABLE 1-continued

Design of Linear Fresnel
Screen Size  40  Aspect Type  NTSC
Focus 1  800  PJ Distance  800
Center Shift  0  CRT Height  0
CRT Angle  9.5  Y. Position  304.8
Yiever Distance  3050  Yiever Angle  0.10

| Hori-zontal axis | | Radiation angle (degrees) R | | Reflec-tion-loss rate | Bright-ness | Radiation angle (degrees) G | | Reflec-tion-loss rate | Bright-ness | Radiation angle (degrees) B | | Reflec-tion-loss rate | Bright-ness | RGB aver-age |
|---|---|---|---|---|---|---|---|---|---|---|---|---|---|---|
| | | H | V | | | H | V | | | H | V | | | |
| 304.8 | 0.10 | 5.93 | −4.6 | 17.22 | 77.27 | −2.22 | −3.2 | 17.38 | 75.31 | −12.36 | −2.64 | 18.64 | 70.12 | |
| 406.4 | 0.13 | 5.1 | −5.7 | 17.82 | 77.25 | −2.81 | −4.17 | 18.35 | 78.32 | −13.43 | −3.43 | 21.16 | 72.38 | 75.98 |
| n:(1.49/1.55<UY>) H Focus 2:∞ Y.Focus 2:10000 | | | | | | | | | | | | | | |
| ⑥ 0 | 0.00 | 8.89 | −2.25 | 16.01 | 68.92 | 0 | −1.75 | 15.9 | 67.49 | −8.89 | −2.25 | 16.01 | 58.92 | |
| 101.6 | 0.03 | 7.84 | −2.8 | 16.05 | 71.92 | −0.8 | −1.92 | 15.95 | 68.68 | −10.09 | −2.03 | 16.15 | 67.62 | |
| 203.2 | 0.07 | 6.91 | −3.61 | 16.21 | 75.41 | −0.58 | −2.42 | 16.2 | 71.87 | −11.41 | −2.17 | 16.81 | 68.28 | |
| 304.8 | 0.10 | 6.07 | −4.6 | 16.6 | 77.75 | −2.3 | −3.2 | 16.88 | 75.78 | −12.87 | −2.68 | 18.66 | 70.16 | |
| 406.4 | 0.13 | 5.31 | −5.7 | 17.35 | 77.53 | −2.95 | −4.18 | 18.23 | 78.51 | −14.45 | −3.52 | 22.73 | 70.99 | 75.68 |
| n:(1.49/1.55<UY>) H Focus 2:10000 Y.Focus 2:∞ | | | | | | | | | | | | | | |
| ⑦ 0 | 0.00 | 8.89 | −0.46 | 15.8 | 55.45 | 0 | 0 | 15.71 | 53.24 | −8.89 | −0.46 | 15.8 | 55.45 | |
| 101.6 | 0.03 | 7.25 | −0.97 | 15.82 | 59.47 | −1.42 | −0.17 | 15.77 | 54.66 | −10.76 | −0.26 | 16 | 53.68 | |
| 203.2 | 0.07 | 5.8 | −1.74 | 16 | 65.02 | −2.82 | −0.66 | 16.11 | 58.58 | −12.95 | −0.44 | 16.96 | 54.43 | |
| 304.8 | 0.10 | 4.48 | −2.69 | 16.49 | 70.65 | −4.22 | −1.42 | 17.12 | 63.95 | −15.59 | −1.01 | 20.09 | 56.45 | |
| 406.4 | 0.13 | 3.26 | −3.74 | 17.52 | 74.70 | −5.61 | −2.39 | 19.3 | 69.05 | −19.09 | −2.02 | 28.86 | 55.88 | 66.54 |
| n:(1.55<UY>/1.49) H Focus 2:10000 Y.Focus 2:∞ | | | | | | | | | | | | | | |
| ⑧ 0 | 0.00 | 8.89 | −0.47 | 15.59 | 55.43 | 0 | 0 | 15.84 | 53.16 | −8.89 | −0.47 | 15.95 | 55.43 | |
| 101.6 | 0.03 | 7.24 | −1 | 15.97 | 59.60 | −1.4 | −0.17 | 15.9 | 54.58 | −10.7 | −0.27 | 16.12 | 53.70 | |
| 203.2 | 0.07 | 5.72 | −1.79 | 16.13 | 65.32 | −2.78 | −0.68 | 16.18 | 58.70 | −12.69 | −0.44 | 16.86 | 54.59 | |
| 304.8 | 0.10 | 4.31 | −2.76 | 16.55 | 71.11 | −4.12 | −1.46 | 16.94 | 64.39 | −14.89 | −1 | 19.02 | 57.42 | |
| 406.4 | 0.13 | 2.99 | −3.85 | 17.38 | 75.44 | −5.42 | −2.45 | 18.52 | 70.08 | −17.41 | −1.93 | 24.07 | 59.91 | 68.47 |
| n:(1.55<UY>/1.49) H Focus 2:∞ Y.Focus 2:10000 | | | | | | | | | | | | | | |
| ⑨ 0 | 0.00 | 8.89 | −2.27 | 16.24 | 68.87 | 0 | −1.75 | 16.1 | 67.33 | −8.89 | −2.27 | 16.24 | 68.87 | |
| 101.6 | 0.03 | 7.83 | −2.84 | 16.28 | 71.97 | −0.79 | −1.92 | 16.15 | 68.51 | −10.03 | −2.04 | 16.36 | 67.54 | |
| 203.2 | 0.07 | 6.84 | −3.67 | 16.45 | 75.50 | −1.54 | −2.44 | 16.37 | 71.85 | −11.2 | −2.17 | 16.87 | 68.32 | |
| 304.8 | 0.10 | 5.93 | −4.69 | 16.8 | 77.87 | −2.22 | −3.24 | 16.9 | 75.95 | −12.36 | −2.68 | 18.18 | 70.76 | |
| 406.4 | 0.13 | 5.1 | −5.84 | 17.44 | 77.59 | −2.81 | −4.26 | 17.91 | 79.04 | −13.43 | −3.5 | 20.75 | 73.08 | 76.57 |

The horizontal radiation angle expressed in terms of degrees, the vertical radiation angle expressed in terms of degrees, the reflection-loss factor expressed in terms of percents (%) as well as the relative brightness of the three RGB colors on the right side at the uppermost level of the screen with an NTSC screen size of 40 inches, a projection distance of 800 mm, a projector convergence angle of 9.5 degrees and an observation distance of 3,050 mm, a value five times the height of the screen, are shown in Table 1.

It should be noted that the brightness of the screen has been calculated under conditions that the vertical-diffusion half-value angle and the horizontal-diffusion half-value angle of the lenticular lens sheet 16 are 7 degrees and 37 degrees respectively, and the brightness of radiated light seen from a point on its line of radiation is set at a value equal to (100—reflection-loss rate) %.

For samples (1) to (3) shown in Table 1, the distances from the screen to points of convergence on the center axes of the screen in the horizontal and vertical directions are 10,000 mm. The refraction indexes of the two linear Fresnel lens sheets of samples (1) and (2) both have a big value of 1.55. The vertical linear Fresnel lens sheet 14 of sample (2) and the horizontal linear Fresnel lens sheet 12 of sample (3) are each made of an ordinary acrylic material with a refraction index of 1.49. The ultraviolet-ray hardened resin of the urethane acrylate family has been used as a material for making the linear Fresnel lens sheet having the high refraction index.

As for samples (4) to (9), the data has been obtained with the distances from the screen to the points of convergence (or the focal distances) in the horizontal and vertical directions modified.

It is obvious from these results of measurement that the projection screen of sample (9) is brightest.

With the vertical linear Fresnel lens sheet 14 made of an ordinary acrylic material having a refraction index of 1.49 and the horizontal linear Fresnel lens sheet 12 having a high refraction index of 1.55, sample (2) is seen to display the brightest screen among samples (1) to (3). In other words, sample (2) has a smallest decrease in gain in this case.

The reasons why the reflection loss can be reduced are explained as follows. For a small angle of refraction, a low refraction index gives a low reflection power. For a big angle of refraction, on the other hand, a high refraction index gives a low reflection power. As a result, by employing a horizontal refracting linear Fresnel lens with a high refraction index at a large distance from the center to give a great angle of refraction and a vertical refracting linear Fresnel lens for a relatively small angle of refraction with a refraction index lower than the refraction index of the horizontal refracting linear Fresnel lens, the reflection loss can be reduced. In addition, the horizontal refracting linear Fresnel lens displays convergence characteristics at the four corners of the screen due to the non-linearity in accordance with Snell's law, and the beam hits the vertical refracting linear Fresnel lens at a shallower angle. As a result, by placing the horizontal refracting linear Fresnel lens with a high refraction index on the beam-projection side and the vertical refracting linear Fresnel lens with a lower refraction index on the beam-radiation side, the reflection loss can be reduced.

Comparison of samples (4) to (9) indicates that large convergence distances on the horizontal/vertical axes give better results. In addition, it is obvious that, in the case of the horizontal refracting linear Fresnel lens sheet 12 with a focus distance greater than that of the vertical refracting linear Fresnel lens sheet 14, good results are obtained.

This is because, at a horizontal/vertical linear Fresnel lens, the longer the distance from a circumference to the center, the more inward the beam hitting the circumference is radiated. Since the diffusion angle of the lenticular lens sheet 16 is big, however, increasing the distance in the horizontal direction to a value greater than that in the vertical direction can relieve the inwardness of the radiated beam.

Figure 5:
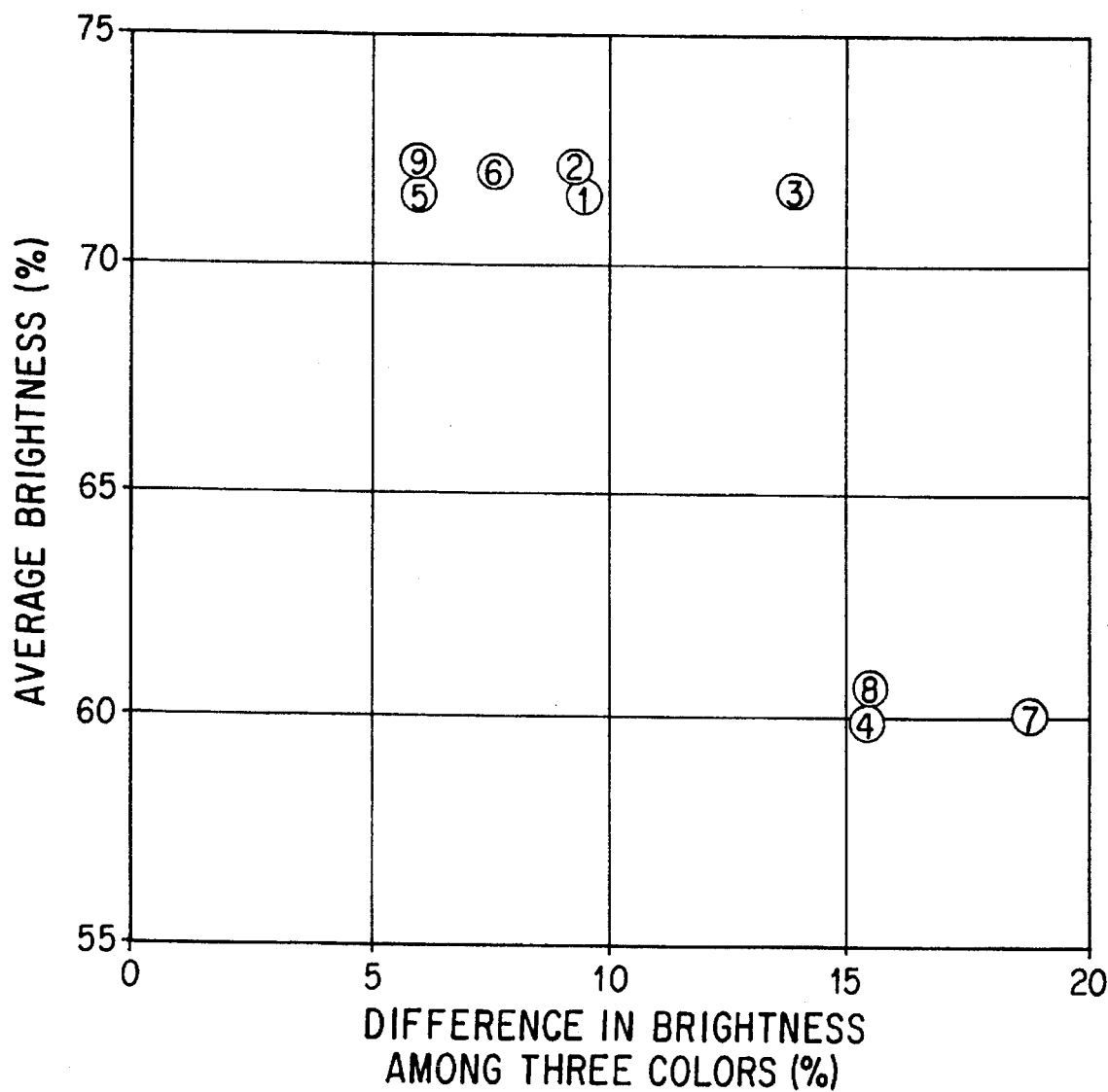
FIG. 5 is a diagram showing relations between an average brightness derived from measurement values for a plurality of samples of the HVL-typed projection screen provided by the present invention and the differences in brightness of the three RGB colors.

FIG. 5 is a diagram showing relations between an average brightness of samples (1) to (9) and the differences in brightness of the three RGB colors. A point shown on the left upper part of the figure indicates a best relation whereas that on the right lower part denotes a worse relation. It is obvious from the relations shown in the figure that sample (9) is the best.

Figure 6:
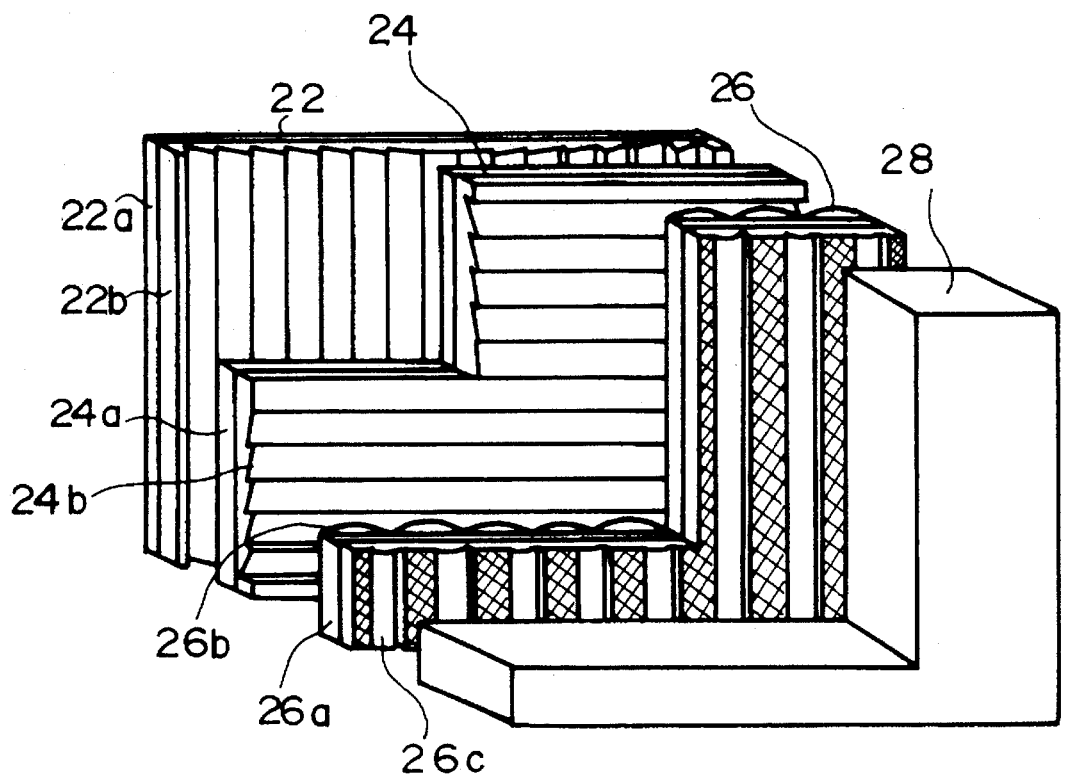
FIG. 6 is a diagram showing a squint view of some cross sections of principal elements of another embodiment implementing an HVL-typed projection screen in accordance with the present invention.

FIG. 6 is a diagram showing a squint view of some cross sections of principal elements of another embodiment implementing an HVL-typed projection screen 12 in accordance with the present invention. In this embodiment, the principal elements are arranged starting from the beam-projection side in the following order: a horizontal refracting linear Fresnel lens sheet 22, a vertical refracting linear Fresnel lens sheet 24, a lenticular lens sheet 26 and a transparent resin plate 28 made of a polymethylene metaacrylate material with a thickness of 3 mm.

As shown in the figure, the horizontal refracting linear Fresnel lens sheet 22 comprises a base film 22a and a Fresnel lens unit 22b on the base film 22a. The Fresnel lens unit 22b is made of a hardened substance of the urethane acrylate family's ultraviolet-ray hardened resin having a refraction index of 1.55. Likewise, the vertical refracting linear Fresnel lens sheet 24 comprises a base film 24a and a Fresnel lens unit 24b on the base film 24a. The Fresnel lens unit 24b is also made of a hardened substance of the urethane acrylate family's ultraviolet-ray hardened resin having a refraction index of 1.51.

Similarly, the lenticular lens sheet 26 comprises a base film 26a, incident-beam lenticular lenses 26b created on one surface of the base film 26a and an output-beam surface 26c on the other surface of the base film 26a. The incident-beam lenticular lenses 26b are also made of a hardened substance of the urethane acrylate family's ultraviolet-ray hardened resin. The output-beam surface 26c comprises beam-outputting lenticular lenses also made of a hardened substance of the urethane acrylate family's ultraviolet-ray hardened resin and protrusions each for creating a beam shielding layer. The beam-outputting lenticular lenses and the shielding-layer creating protrusions are laid out alternately with each other. Furthermore, a beam shielding layer is formed on each of the shielding-layer creating protrusions by means of black ink.

Since the horizontal refracting linear Fresnel lens sheet 22, the vertical refracting linear Fresnel lens sheet 24 and the lenticular lens sheet 26 are each a flexible film sheet, a projection screen comprising even these combined three sheets does not have self-supported mechanical strength. Accordingly, by also including the transparent resin plate 28 in the combination held by a common frame, the combination of the lens sheets is strengthened. As a result, the frame-held combination of the sheets has structural strength required for independence or the like as well as strength for withstanding surface friction, etc. It should be noted that the common frame itself is not shown in the figure.

Figure 7:
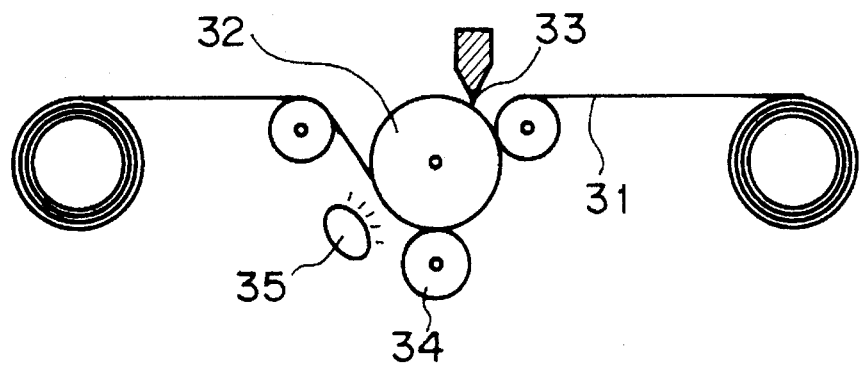
FIG. 7 is a rough drawing showing a side of an apparatus for manufacturing a linear Fresnel lens sheet of the embodiments described above.

FIG. 7 is a rough drawing showing a side of an apparatus for manufacturing a linear Fresnel lens sheet of the embodiments described above. As shown in the figure, a base film 31 such as a PET is lead in a wound state to a mold roller 32, a mold for forming a linear Fresnel lens. Ultraviolet-ray hardened resin 33 is supplied so as to be sandwiched by the base film 31 and the mold roller 32. With the base film 31 and the ultraviolet-ray hardened resin 33 put in a pressed state against the mold roller 32 by means of a nip roller 34, the ultraviolet-ray hardened resin 33 is hardened by applying an ultraviolet ray generated by an ultraviolet-ray lamp 35 thereto. The base film 31 and the ultraviolet-ray hardened resin 33 are then peeled off and separated away from the mold roller 32 before being wound back to a roll to produce a linear Fresnel lens sheet.

Figure 8:
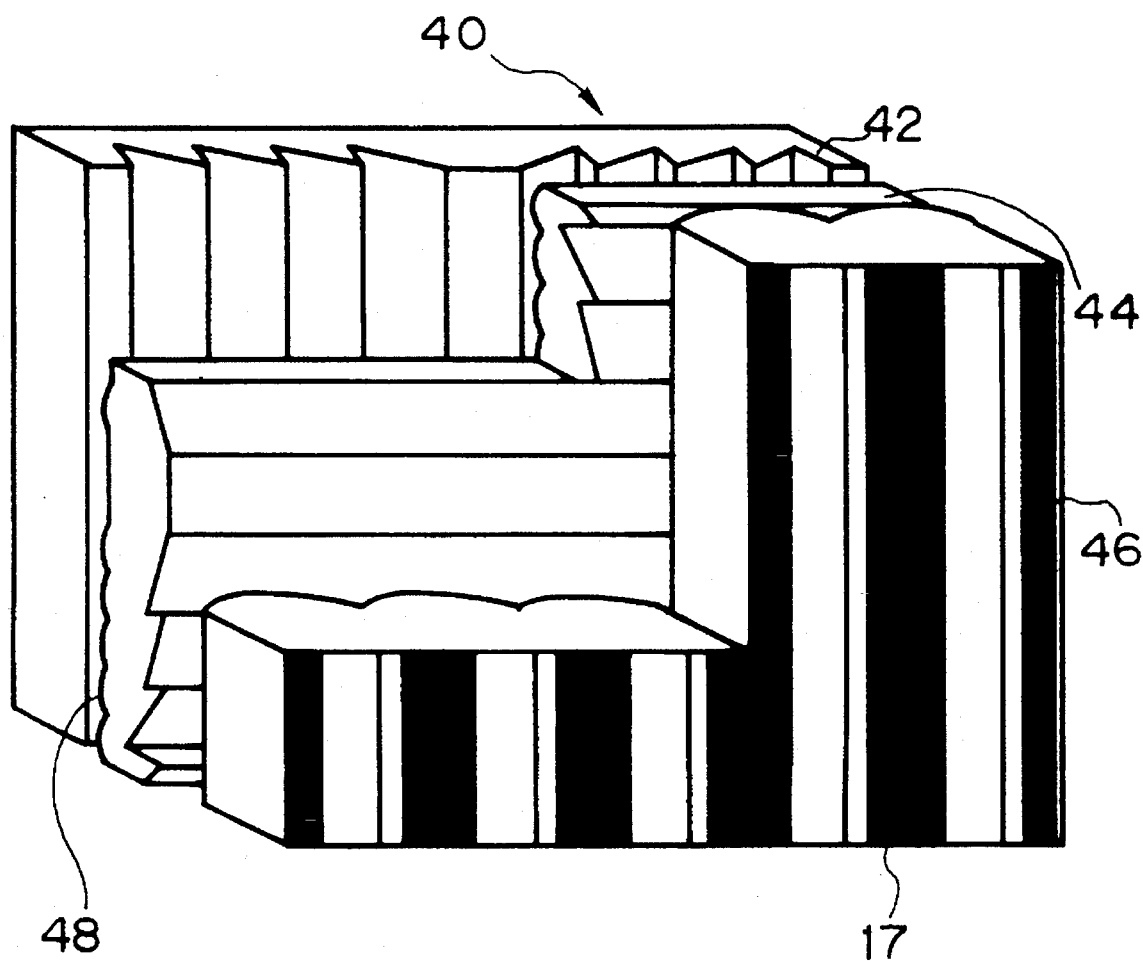
FIG. 8 is a diagram showing a squint view of some cross sections of principal elements of an embodiment implementing an HVL-typed projection screen in accordance with the present invention.

FIG. 8 is a diagram showing a squint view of some cross sections of principal elements of an embodiment implementing an HVL-typed projection screen 40 in accordance with the present invention. As shown in the figure, the projection screen 40 comprises a horizontal refracting linear Fresnel lens sheet 42, a vertical refracting linear Fresnel lens sheet 44 and a light diffusing lenticular lens sheet 46, which are arranged from the beam-projection side starting with the horizontal refracting linear Fresnel lens sheet 42 followed by the vertical refracting linear Fresnel lens sheet 44 and ending with the light diffusing lenticular lens sheet 46. In addition, a microlenticular lens 48 for diverging a beam in the vertical direction is created on the beam-incidence-surface side of the vertical refracting linear Fresnel lens sheet 44. The longer the distance from a point to the center of the screen, the greater the angle of diffusion of the microlenticular lens 48 at the point in the vertical direction.

Figure 9:
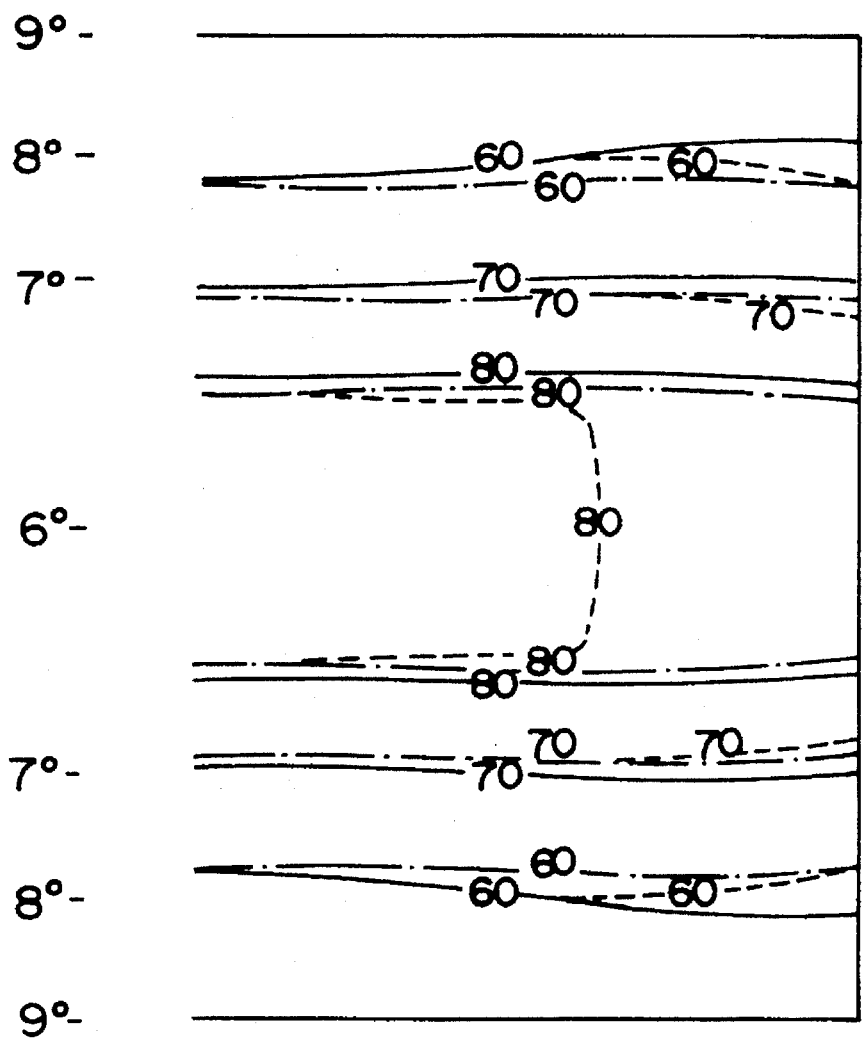
FIG. 9 is a diagram showing distribution of brightness for each color on the embodiment for the projection screen.
Figure 10:
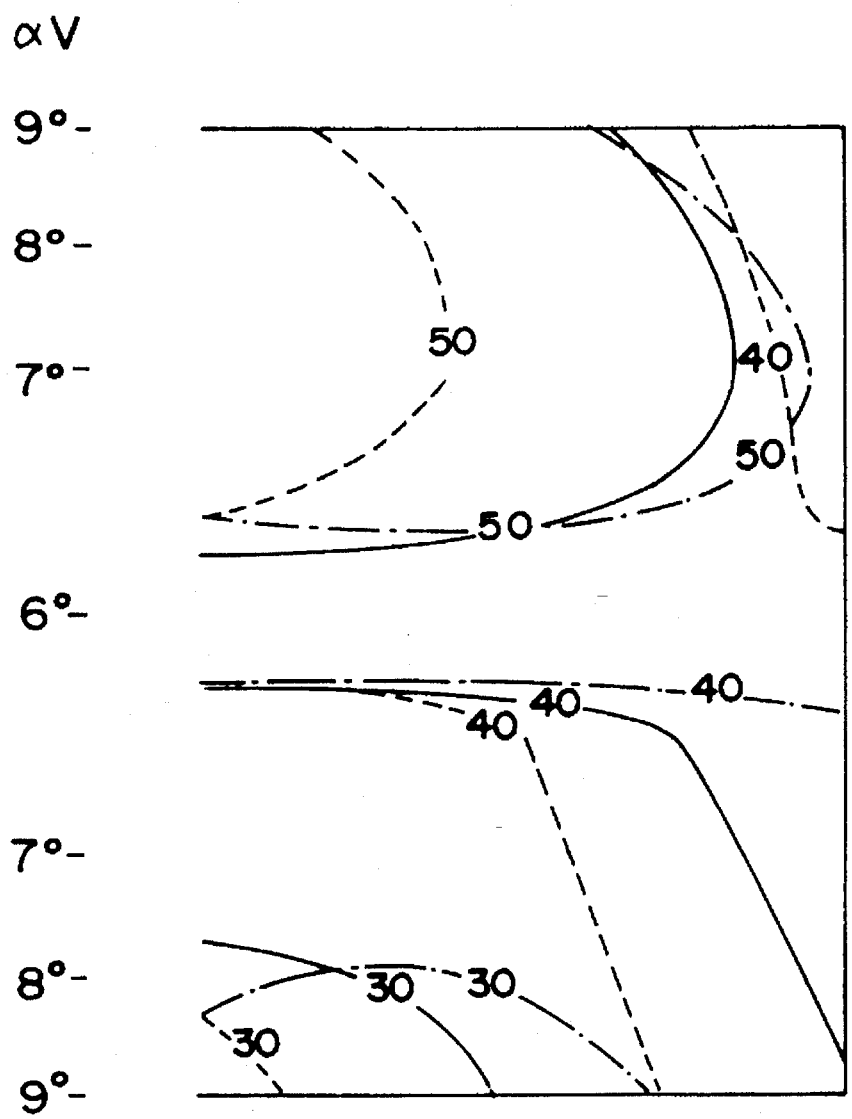
FIG. 10 is a diagram showing distribution of brightness for each color on the embodiment for the projection screen when watched from a position at a distance from the screen longer than that for FIG. 9.

In the case of the projection screen 40 implemented by the embodiment of FIG. 8 with an NTSC screen size of 45 inches, a projection distance of 818 mm and a projector convergence angle of 9.9 degrees, with the light diffusing lenticular lens sheet 46 having a vertical-diffusion half-value angle of 6 degrees and a horizontal-diffusion half-value angle of 40 degrees, with an observation distance of 3,429 mm, a value five times the height of the screen, with a vertical-diffusion half-value angle of 6 degrees at the center of the screen and with a vertical-diffusion half-value angle of 9 degrees at the upper as well as lower ends of the screen, distributions of relative brightness for each color on the screen are shown in FIGS. 9 and 10.

It should be noted that the brightness shown in the figure is quantities which are obtained when the brightness of radiated light seen from a point on its line of radiation is set at a value equal to (100—reflection-loss rate) %.

Distributions of relative brightness for each color of a projection screen comprising the circular Fresnel lens sheet having a vertical-diffusion half-value angle of 6 degrees and a projection screen comprising the conventional linear Fresnel lens sheet are shown in FIGS. 11 to 14. The distributions of relative brightness shown in these figures are obtained when observed at a distance of 3,429 mm and at heights of 0 and 343 mm, and with a fixed vertical-diffusion half-value angle of 6 degrees for both the circular Fresnel lens sheet and the conventional linear Fresnel lens sheet. Comparison of the distributions shown in FIGS. 9 and 10 to those shown in FIGS. 12 and 14 for the conventional linear Fresnel lens sheet clarifies that color unevenness encountered in the conventional linear Fresnel lens sheet is eliminated.

Figure 11:
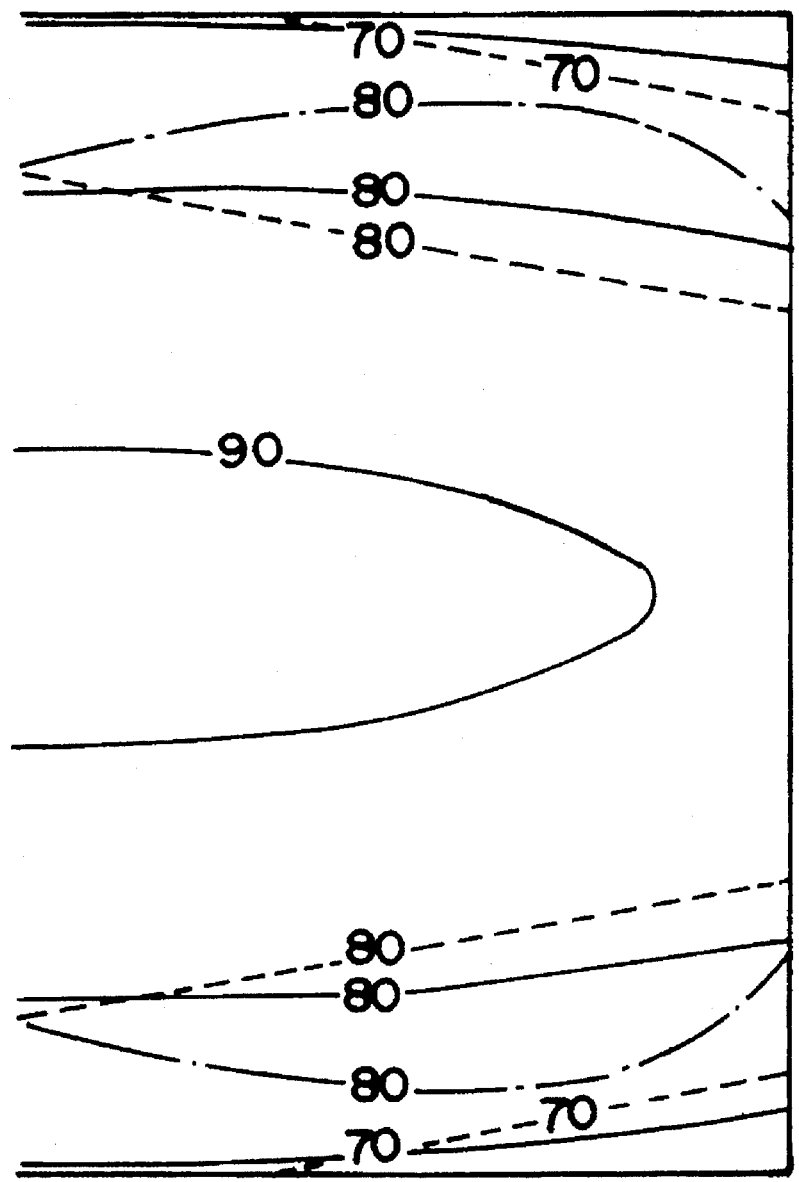
FIG. 11 is a diagram showing distribution of brightness for each color on a projection screen employing a circular Fresnel lens with a constant vertical-diffusion half-value angle of 6 degrees.
Figure 12:
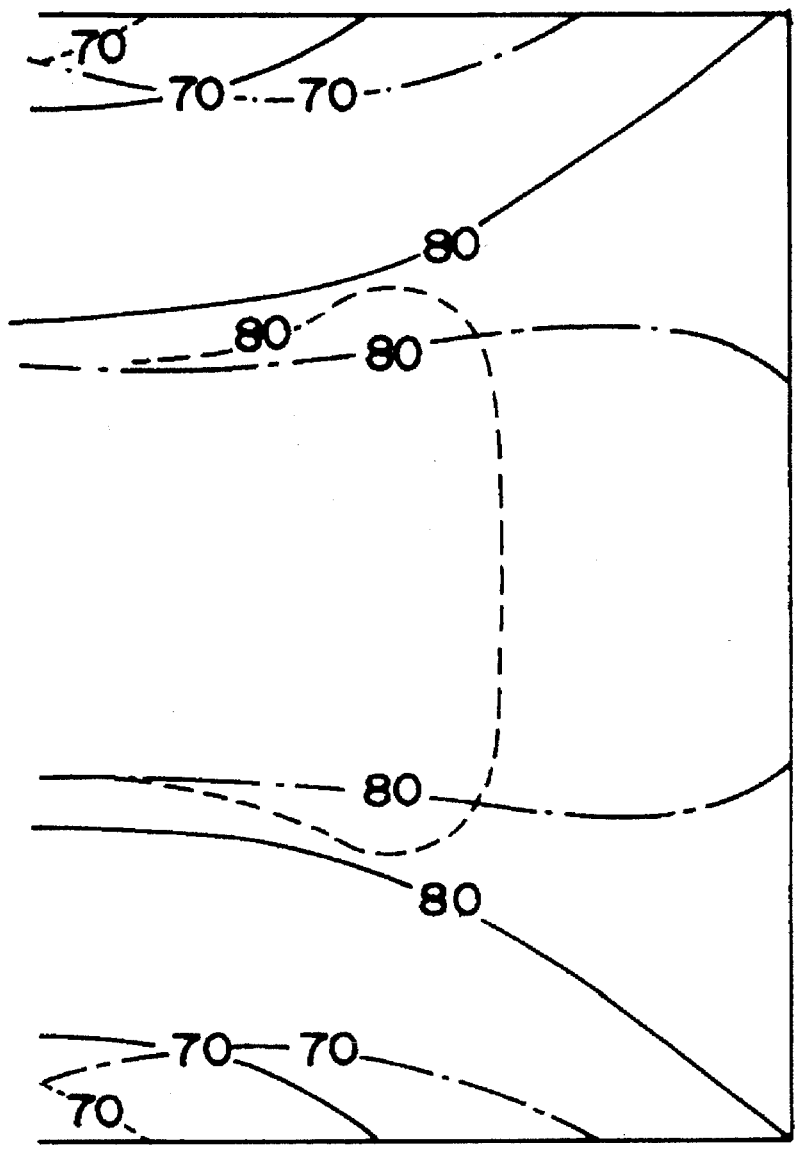
FIG. 12 is a diagram showing distribution of brightness for each color similar to that shown in FIG. 11 except that the projection screen employs the conventional circular Fresnel lens.
Figure 13:
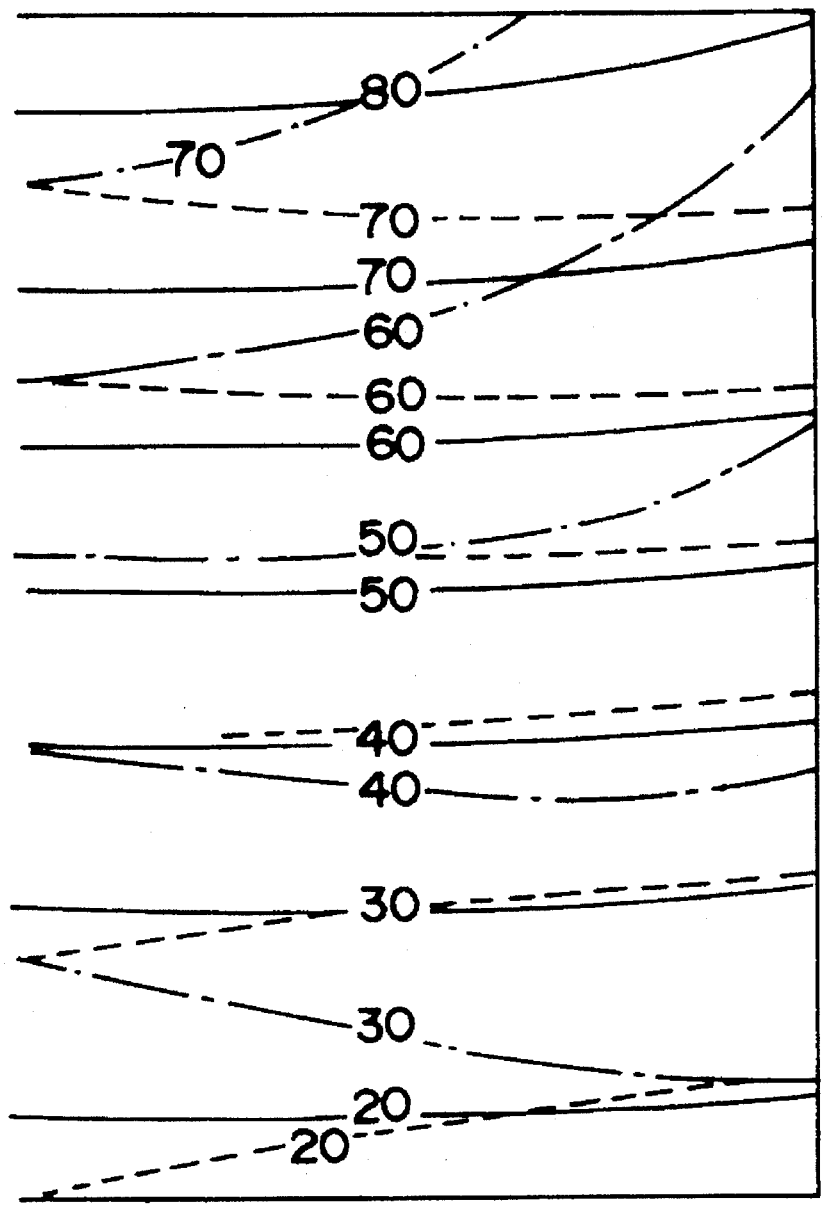
FIG. 13 is a diagram showing distribution of brightness for each color similar to that shown in FIG. 11 except that the projection screen is watched from a location at a different distance from the projection screen.
Figure 14:
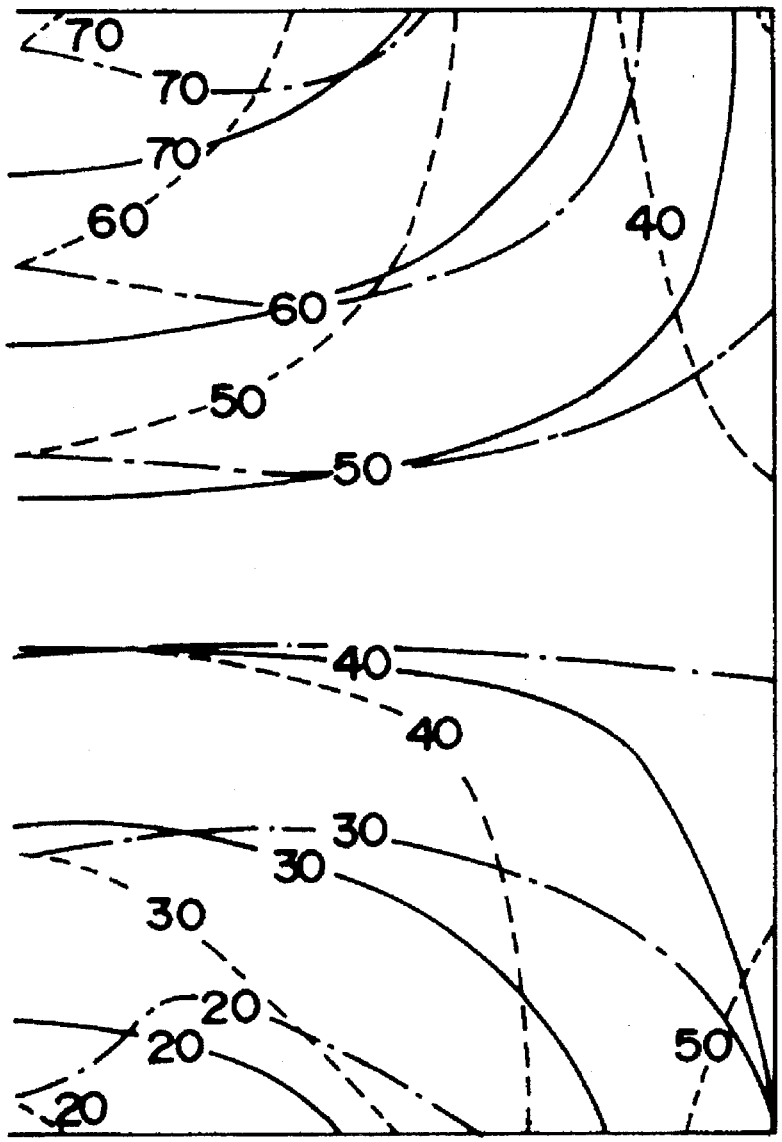
FIG. 14 is a diagram showing distribution of brightness for each color similar to that shown in FIG. 12 except that the projection screen is watched from a location at a different distance from the projection screen.

More detailed comparison of the distribution shown in FIG. 9 to that shown in FIG. 11 indicates that the latter is brighter and has less brightness unevenness. However, the former is superior to the latter as far as the color unevenness is concerned. As the observer slightly moves the point of vision from the center of the screen up and down, striking color unevenness and brightness unevenness appear on the distribution shown in FIG. 13 for a fixed vertical diffusion angle in spite of the circular Fresnel lens. In the case of the distribution shown in FIG. 10, on the other hand, not only does the maximum value decrease, but the minimum value also increases, resulting in a smaller difference. As a result, the brightness unevenness decreases substantially. At the same time, the distribution pattern for each color becomes simpler, causing the color unevenness and the brightness unevenness to decrease.

The distribution shown in FIG. 9 is compared to that shown in FIG. 11 from the same point of view. At the lower and upper parts of the screen, the distribution shown in FIG. 9 is darker than that shown in FIG. 11 to a certain degree. However, the former is still acceptable. The distribution of FIG. 10 with the line of vision shifted shows a better result than that shown in FIG. 13. As an overall, the projection screen implemented by the embodiment can be said to be superior to the circular Fresnel lens.

Furthermore, when a projection screen with a fixed vertical-diffusion angle is watched at a distance of 10 m on the central axis, the distance of the conventional design, the four corners of the screen abruptly become dark in comparison to the center of the screen due to the fact that the angle of radiation has a more inward characteristic at the peripheral than at the center as described earlier. With a variable vertical-diffusion angle as in the case of the embodiment, however, the differences in brightness among locations on the screen can be reduced.

As a result, a projection screen with a fixed vertical-diffusion angle displays better pictures than a projection screen with a variable vertical-diffusion angle when watched from the best position. However, the former allows no freedom of observation position. In the case of the projection screen with a variable vertical-diffusion angle provided by the present invention, on the other hand, a picture with an almost uniform quality over a wider range of observation can be obtained.

In the embodiment described above, a microlenticular lens 48 is created on the incidence-surface side of the vertical refracting linear Fresnel lens sheet 44, one of the components constituting the projection screen 40. It should be noted, however, that applications of the present invention are not limited to this scheme. In brief, the present invention can be applied to any design version as far as the projection screen is designed so that, the longer the distance from a point on the screen to the center, the greater the vertical-direction diffusion angle at the point.

Figure 15:
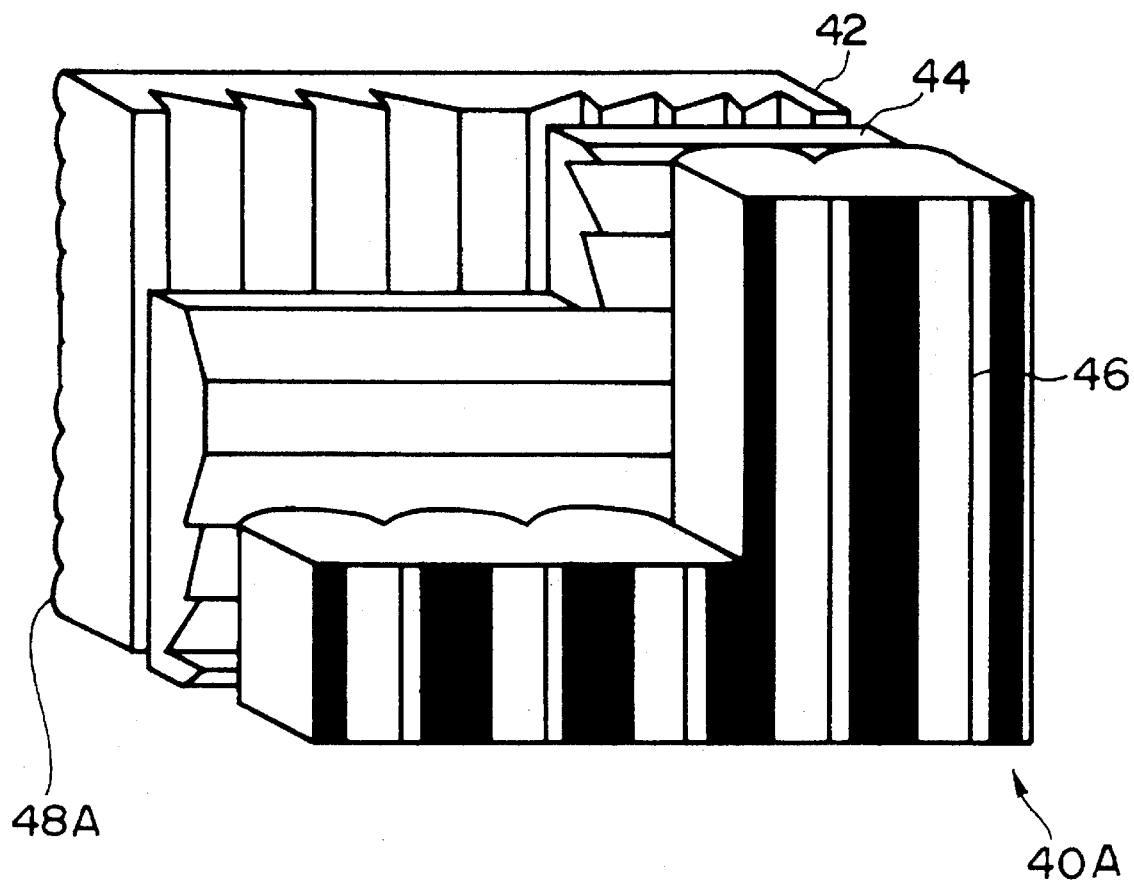
FIG. 15 is a diagram showing a squint view of some cross sections of principal elements of another embodiment implementing an HVL-typed projection screen in accordance with the present invention.

For example, the embodiment shown in FIG. 15, wherein a microlenticular lens 48A for diverging a beam in the vertical direction is created on the incidence-surface side of the horizontal refracting linear Fresnel lens sheet 42, will therefore work as well. This is because the microlenticular lens 48A is created so that, the longer the distance from a point on the screen to the center, the greater the vertical-direction diffusion angle at the point. In this case, the diffusion angle of the lenticular lens 48A is varied by changing the radius of curvature of the microlenticular lens sequentially for every one to several pitches starting from the center of the screen. As an alternative, microlenticular lenses with large and small radii of curvature are dispersed into distribution which can be modified to give a variable angle of diffusion.

Figure 16:
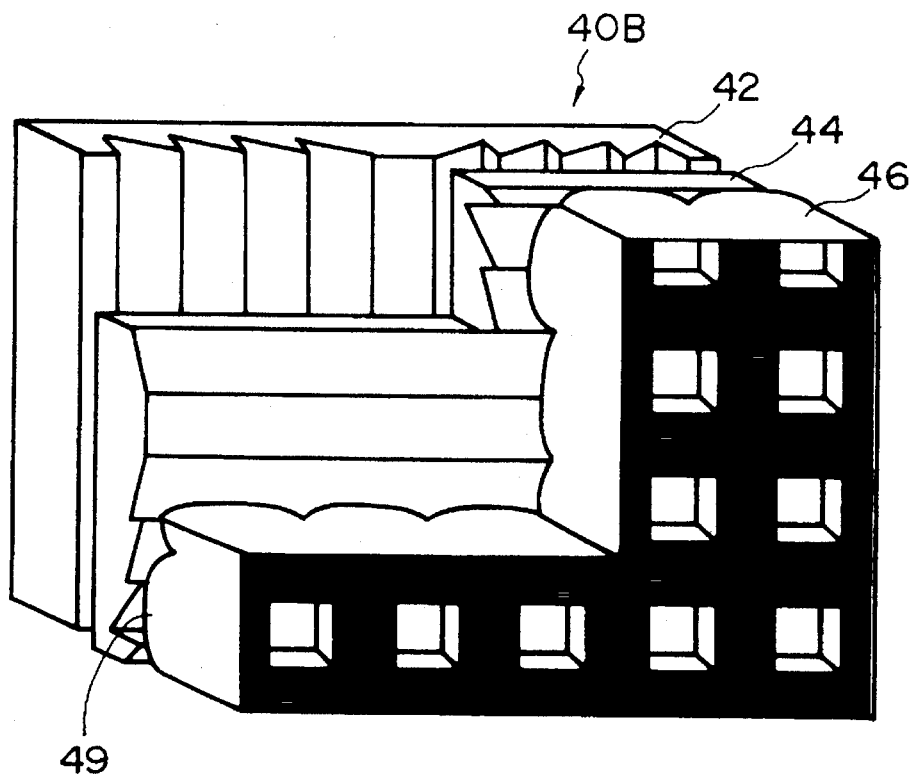
FIG. 16 is a diagram showing a squint view of some cross sections of principal elements of still another embodiment implementing an HVL-typed projection screen in accordance with the present invention.

Another alternative for providing a variable angle of diffusion in the vertical direction is shown in an embodiment of FIG. 16. In this embodiment, fly-eye lenses 49 are further created on the incidence-surface side of a lenticular lens sheet 46. Likewise, the fly-eye lens 49 can be created in such a way that, the longer the distance from a point to the center of the screen, the greater the vertical-direction diffusion angle at the point.

Figure 17:
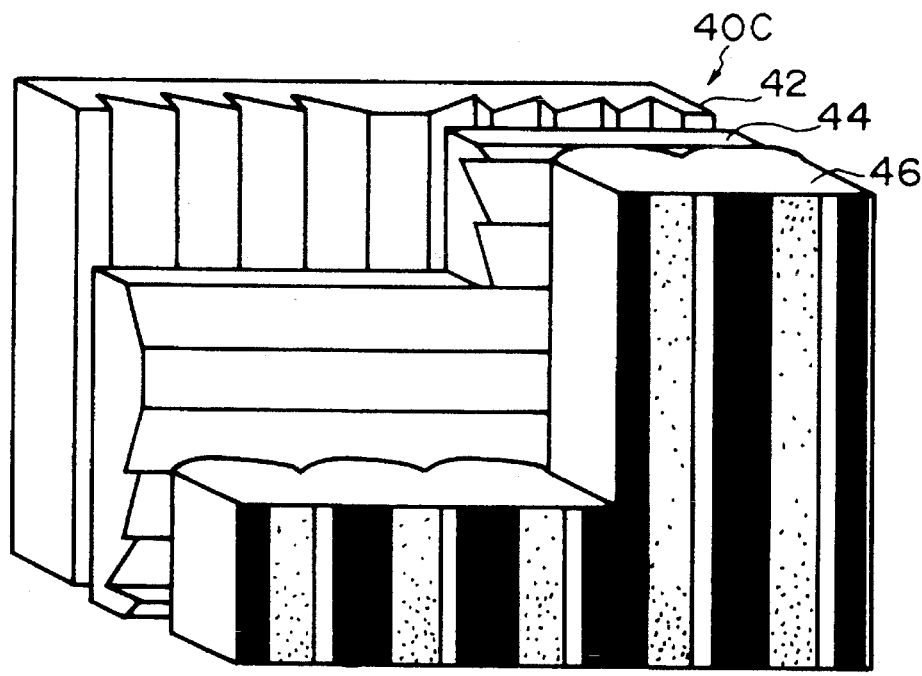
FIG. 17 is a diagram showing a squint view of some cross sections of principal elements of yet another embodiment implementing an HVL-typed projection screen in accordance with the present invention.

Still another alternative for providing a variable angle of diffusion in the vertical direction is shown in an embodiment of FIG. 17. In this embodiment, the amount, the composition, etc. of a beam diffusing material to be added to a lenticular lens sheet 46 are varied at the center as well as the upper and lower portions of the screen sheet to result in a variable angle of diffusion in the vertical direction.

It should be noted, however, that, in the case of the embodiment shown in FIG. 16, the angles of diffusion of the fly-eye lenses 49 in the vertical and horizontal directions are not easy to adjust individually. Similarly, the distributions of the amount, the composition, etc. of a beam diffusing material to be added to a lenticular lens sheet 46 are also not easy to control. Accordingly, in comparison to the embodiments shown FIGS. 16 and 17, the embodiments shown in FIGS. 8 and 15 have advantages that the latter are easy to implement.

Figure 18:
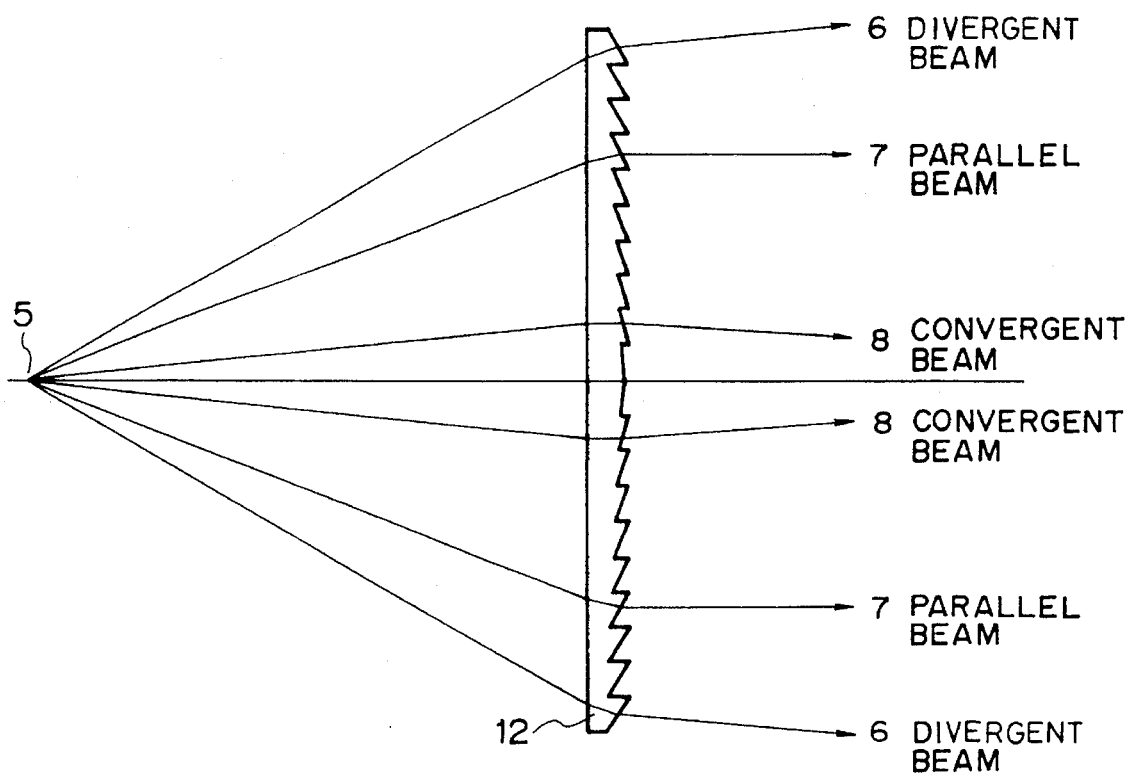
FIG. 18 is a top view of a cross-sectional diagram of a horizontal refracting linear Fresnel lens sheet provided by the present invention showing radiation directions of beams.
Figure 19A:
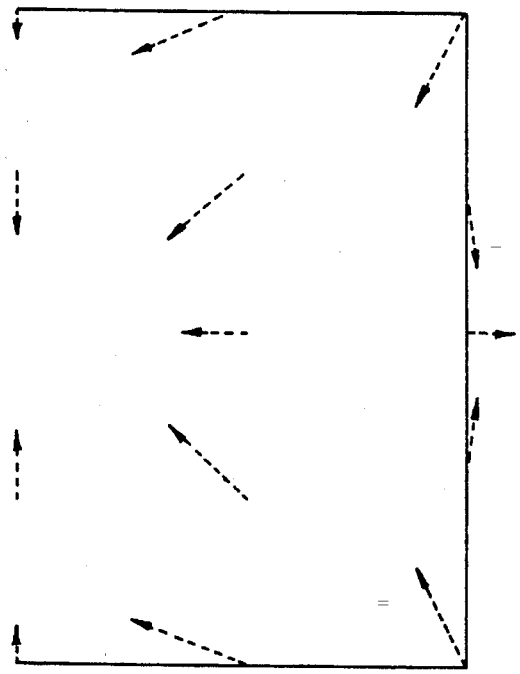
FIG. 19(a)–19(c) are a diagram (FIG. 19(a)) showing measurement results of the radiation-angle tangent of the green beam for the embodiment shown in FIG. 1 as well as projection screens (FIGS. 19(b) and 19(c)) described in Examples for Comparison 1 and 2.
Figure 19B:
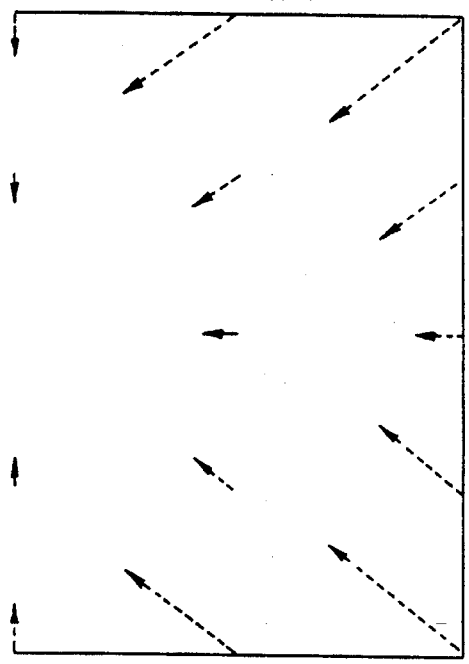
Figure 19C:
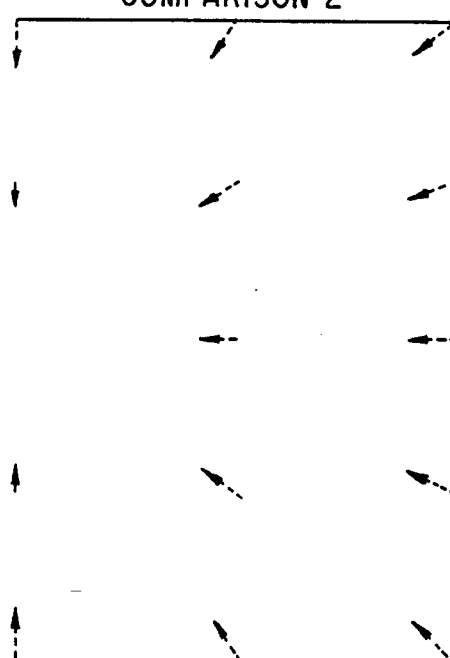

Next, another embodiment is explained by referring to FIGS. 18 and 19. Basically, the embodiment shown in FIG. 18 has the same configuration as the projection screen 10 implemented by the embodiment shown in FIG. 1. Accordingly, the following description is given by referring to FIG. 1.

FIG. 18 is a top view of a cross-sectional diagram of a horizontal-direction refracting linear Fresnel lens sheet 12 provided by the present invention showing radiation directions of beams passing through the horizontal-direction refracting linear Fresnel lens sheet 12 from a light source 5. Here, in order to clarify the configuration of the present invention, the technical terms in use are first explained. By a 'central axis' on the horizontal-direction refracting linear Fresnel lens sheet 12 or a vertical-direction refracting linear Fresnel lens sheet 14, a linear portion on each of the horizontal direction refracting linear Fresnel lens sheet 12 and the vertical-direction refracting linear Fresnel lens sheet 14 with a zero lens angle is meant. A 'horizontal axis' is a line on the screen or a lens sheet which coincides with the central axis of the vertical-direction refracting linear Fresnel lens sheet 14. A 'vertical axis' is a line on the screen or a lens sheet which coincides with the central axis of the horizontal-direction refracting linear Fresnel lens sheet 12. A 'vertical-direction maximum center distance' is a maximum distance from the horizontal axis to the top or bottom edge of the screen. In the case of the vertical-direction refracting linear Fresnel lens sheet 14 with an upward or downward eccentric central axis, the longer vertical-direction maximum center distance is implied. A 'horizontal-direction maximum center distance' is a maximum distance from the vertical axis to the left or right edge of the screen. In the case of the horizontal-direction refracting linear Fresnel lens sheet 12 with an eccentric central axis to the left or right, the longer horizontal-direction maximum center distance is implied.

The horizontal-direction refracting linear Fresnel lens sheet 12 forms converging-system converged beams 8 centering on the horizontal axis of the horizontal-direction refracting linear Fresnel lens sheet 12 within a range of distances from the axis smaller than the vertical-direction maximum center distances, or in close proximity to the center. By making the optical system of this portion coincide with the vertical-direction refracting linear Fresnel lens sheet 14, a forming metal pattern of the same type can be used for both the vertical-direction refracting linear Fresnel lens sheet 12 and the horizontal-direction refracting linear Fresnel lens sheet 14 as will be described later. Furthermore, at a point located at a distance from the center longer than the vertical-direction maximum center distance but shorter than horizontal-direction maximum center distance, beams 7 are radiated in parallel to each other so that, at the outermost peripherals in the horizontal direction, weak-divergence-system diverged beams 6 are generated. In this case, a divergence system is created at the outermost peripherals on the horizontal axis only but not on the upper and lower portions of the lens sheet.

By making the optical system of the linear Fresnel lens sheet a weak divergence system at the peripheral in the horizontal direction as described above, transient convergence characteristics due to the use of the linear Fresnel lens can be relieved. On top of that, by making the lens angle shallow, the reflection loss of the beam at the surface of the lens can also be reduced as well. As a result, the luminance at the peripherals can be increased.

The linear Fresnel lens sheet used in the present invention is made of an optically transparent base material. Here, as an optically transparent base material, a single substance or a compound of acrylic ester or metaacrylic ester such as methyl polymetaacrylate and methyl polyacrylate, polyester such as polyethylene telephtharate and polybutylene, thermoplastics resin such as polycarbonate, polystyrene and polymethyl pentene, acrylate such as polyfunctional urethane acrylate cross-linked by an ultraviolet ray of an electron beam and polyester acrylate, transparent resin such as unsaturated polyester, a transparent ceramic material such as transparent glass or the like can be used.

A selected transparent material is required to have transparency that minimizes the amount of light passing through the material to a certain degree so as not to give rise to problems in their applications. A hyaline transparent material is most desirable. When the transparent material is used for making a lens sheet, however, a colored transparent material or a mat semi-transparent material is also acceptable for some applications.

In order to prevent the shape of a projection screen made of a transparent material from changing because of an external force or the like, a ratio of the screen thickness to the screen height is normally set at a value in the range 0.003 to 0.01. As an alternative, a filmy sheet with a thickness ranging from 50 to 300 microns can also be used through a support mechanism extended to the TV set.

A group of prismatic unit lenses can be created on the surface of a transparent material in parallel to each other by using, for example, a well-known thermal press technique disclosed in Japanese Patent Laid-open No. S56-157310, an extrusion molding technique, a hardening technique disclosed in Japanese Patent Laid-open No. S61-156273 or a formation technique disclosed in Japanese Patent Laid-open No. H3-223883 and U.S. patent application Ser. No. 4576850. With the hardening technique, an ultraviolet-ray-hardenable thermoplastics resin film undergoes an embossing fabrication process by means of a roll embossing plate before being hardened using an ultraviolet ray applied to the film. In the formation technique, resin liquid hardenable by an ultraviolet ray or an electron beam is used for coating a roll hollowed plate with its hollow resembling the shape of a lens till the hollow is filled up with the resin liquid and then the resin liquid coated on the plate is covered by a transparent base film. With the transparent film covering the plate through the resin liquid, an ultraviolet ray or an electron beam is then applied thereto for hardening the resin liquid. The hardened resin and the base film attached thereto are removed from the roll hollowed plate. In this way, the shape of the lens in the hollow of the roll hollowed plate is formed on a hardened resin layer.

In this technique, a formed lens undergoes a coiling fabrication process. In order to prevent cracks from resulting from the fabrication process, a relatively bendable and flexible ultraviolet-ray or electron-beam hardened resin material is selected.

The technique can be used as a good manufacturing method in the present invention. This is because the formation metal pattern on the roll embossing plate serves as an optical system common to both the vertical and horizontal-direction refracting linear Fresnel lens sheets to be created in a range centering on the middle of the lens within the vertical-direction maximum center distance. A single formation mold can thus be used, requiring no other formation molds. To be more specific, in the case of a horizontal-direction refracting linear Fresnel lens sheet, fabrication is carried out by means of the single metal pattern by cutting to the top-to-bottom width. In the case of a vertical-direction refracting linear Fresnel lens sheet, on the other hand, fabrication is carried out by means of the same single metal pattern but by cutting to the left-to-right width.

The lenticular lens sheet used in the present invention can typically be a sheet of a linear-lens array comprising pillar-shaped unit lenses arranged adjacently to each other with their ridge lines set in parallel to one another. Such a sheet of a linear-lens array is a lenticular lens sheet defined in a wide sense. As an alternative, the lenticular lens sheet used in the present invention can also be a protruding-lens sheet fly-eye lens comprising a plurality of protruding unit lenses 42 arranged in two-dimensional directions with their circumferences separated from each other. An example of the protruding unit lenses 42 is lenses each having a half-spherical surface. The protruding-lens sheet fly-eye lens is, on the other hand, a wide-sense definition of a lens.

The cross section of the unit lens can be a circle, an ellipse, a cardioid, a shape resembling Rankine's oval, a cycloid or an involute which has a contiguous and smooth circumference or part or the whole of a polygon such as a triangle, a quadrangle and a hexangle.

A unit lens can be a convex or concave lens. From the design, manufacturing easiness, beam convergence, and beam-diffusion characteristic points of view, however, a unit lens with its shape resembling a cylinder or an elliptical pillar is desirable. The unit lens with a shape resembling an elliptical pillar, the longitudinal axis of which coincides with the normal line to a surface light source, is particularly desirable because of its excellent luminance characteristics.

A lens sheet can be used in a single-sheet configuration. As an alternative, two lens sheets can be used as overlapped layers with their ridge lines crossing each other perpendicularly. In this way, the angle of diffusion can be controlled in two directions, the up-and-down and left-to-right directions, by using pillar-shaped lenses. In the latter case, the lens surfaces can be oriented in the same direction for both the sheets to give the best arrangement with a high optical transparency. Of course, the lens sheets can overlap each other with lenses of one sheet directly facing those of the other or with the lens surfaces sandwiched by the two lens sheets.

In order to increase the contrast, a beam absorbing layer is provided on the non-converging part of each incidence-side lens on the surface of the watching side in parallel to its ridge line.

The lenticular lens sheet 16 is formed from a transparent base material. Here, the same material as the linear Fresnel lens sheet described earlier can be used as a transparent base. Normally, the acrylic or polycarbonate resin is used.

In addition, particles or beads each having a particle diameter of about several tens of microns and a refraction index different from that of the resin used as a transparent base material are mixed with the resin for diverging beams.

When such a transparent base material is used for making a lenticular lens sheet of a projection screen, thickness and strength are required to a certain degree in the course of manufacturing and applications. Normally, transparent base material with a thickness in the range 0.5 to 1.5 mm is therefore used.

The same method as the linear Fresnel lens sheet described earlier can be adopted as a technique for forming the lens shape of a lenticular lens sheet.

The size of most linear unit lenses in use has such a value that the unit lenses are normally arranged with a pitch ranging from 0.5 to 1.0 mm. In the case of a large screen exceeding 100 inches in size, however, the pitch may be increased to a value equal to or greater than 1.0 mm.

Next, desirable versions of the embodiments provided by the present invention are explained by providing some actual examples.

(Actual Example 1)

A projection screen provided by the present invention satisfying the following conditions was manufactured.
o The size of the projection size
 46 inches (NTSC)
o The aspect ratio of the projection size
 3 : 4
o Projection distance
 869 mm (The same position as f1)
o CRT convergence angle
 9.5 degrees
o The refraction index of the lens unit of the linear Fresnel lens sheet
 1.55
o The refraction index of the basic material of the linear Fresnel lens sheet
 1.49
o The focal distance f2 of the linear Fresnel lens sheet is expressed by the following general formula:

$$f_2=((R_m-R)/(|R_m-R|)X(F_0+F_1X(|R_m/(R_m-R)|)^n)$$

where n is the rate of change in focal distance having the values n=1, 2, 3 . . . whereas $F_0$ and $F_1$ are arbitrary constants.

In this actual example, n=1, $F_0$=0 and $F_1$=3,000. Accordingly, in this actual example, the focal distance $f_2$ of the linear Fresnel lens sheet is given as follows:

$$f_2=3,000XR_m/(R_m-R)$$

where R is a distance (or displacement) from the central axis of the linear Fresnel lens and Rm is a distance from the central axis to a point in parallel radiated beams. In addition, $f_2$<0 for $R_m$<R, which in this case means a divergence system with a convergence point existing at the focal distance $f_2$ on the projection side. In this actual example, Rm is the average value of a horizontal maximum displacement and a vertical maximum displacement.

(Example for Comparison 1)

As an example for comparison 1, a projection screen was manufactured under the following conditions:

The optical system of the linear Fresnel lens sheet was set with a fixed focal distance $f_2$ of 2,000 mm. The other conditions were the same as those of Actual Example 1.

(Example for Comparison 2)

As an example for comparison 2, a projection screen was manufactured under the following conditions:

As a substitute for the vertical-direction refracting linear Fresnel lens sheet and the horizontal-direction refracting linear Fresnel lens sheet, circular Fresnel lens sheets each having a focal distance $F_2$ of 20,000 mm were used. The other conditions were the same as those of Actual Example 1.

The optical characteristics of the actual example as well as Examples for Comparison 1 and 2 described above were measured to give results shown in Tables 2 to 4 given below.

In the case of a projection tube located on the optical axis of a projection screen employing a vertical-direction refracting linear Fresnel lens sheet and a horizontal-direction refracting linear Fresnel lens sheet, a picture projected on the screen can be assumed to be symmetrical to the vertical and horizontal central lines of the screen. Accordingly, only the upper portion on the right side and the middle portion on the right side of the projection screen seen from the observer's side are shown in Tables 2 to 4. It is obvious from Tables 2 to 4 that, as a whole, the actual example incurs reflection loss less than Example for Comparison 1.

In addition, the smaller the difference between the RGB maximum and minimum values, the less the reflection loss. The difference may vary from position to position. In this case, the smoother the variation in difference, the less the reflection loss. Since the actual example has a small difference between RGBs at the same location and a small difference dependent upon the position of each color, the actual example provides results better than those of Examples for Comparison 1 and 2.

TABLE 2

Actual Example 1

| | | Vertical coordinates | | | | | |
|---|---|---|---|---|---|---|---|
| | | 350.5 | | | 0.0 | | |
| | | Horizontal coordinates | | | | | |
| | | 0 | 233.7 | 467.4 | 0 | 233.7 | 467.4 |
| Red | Angle of radiation H | 8.81 | 4.63 | 5.67 | 9.5 | 6.89 | 8.57 |
| | Angle of radiation V | −1.47 | −2.97 | −5.47 | 0 | 0 | 0 |
| | Reflection loss | 16.76 | 17.03 | 17.99 | 16.06 | 16.15 | 16.63 |
| Green | Angle of radiation H | 0 | −3.93 | −1.92 | 0 | −1.91 | 1.27 |
| | Angle of radiation V | −0.96 | −1.79 | −3.81 | 0 | 0 | 0 |
| | Reflection loss | 16.64 | 17.17 | 18.44 | 16.06 | 16.23 | 16.88 |
| Blue | Angle of radiation H | −8.81 | −14.08 | −12.12 | −9.5 | −12.43 | −8.44 |
| | Angle of radiation V | −1.47 | −1.6 | −2.85 | 0 | 0 | 0 |
| | Reflection loss | 16.76 | 18.22 | 21.04 | 16.06 | 16.71 | 18.14 |

TABLE 3

Example for Comparison 1

| | | Vertical coordinates | | | | | |
|---|---|---|---|---|---|---|---|
| | | 350.5 | | | 0.0 | | |
| | | Horizontal coordinates | | | | | |
| | | 0 | 233.7 | 467.4 | 0 | 233.7 | 467.4 |
| Red | Angle of radiation H | 8.81 | 5.8 | 3.27 | 9.5 | 7.99 | 6.38 |
| | Angle of radiation V | −1.52 | −3.05 | −5.46 | 0 | 0 | 0 |
| | Reflection loss | 16.77 | 17 | 18.41 | 16.06 | 16.13 | 16.88 |
| Green | Angle of radiation H | 0 | −2.58 | −4.91 | 0 | −0.67 | −1.34 |
| | Angle of radiation V | −1 | −1.82 | −3.92 | 0 | 0 | 0 |
| | Reflection loss | 16.65 | 17.04 | 19.54 | 16.06 | 16.17 | 17.46 |
| Blue | Angle of radiation H | −8.81 | −12.41 | −16.63 | −9.5 | −10.91 | −12.03 |
| | Angle of radiation V | −1.52 | −1.53 | −3.29 | 0 | 0 | 0 |
| | Reflection loss | 16.77 | 17.78 | 25.14 | 16.06 | 16.5 | 19.98 |

TABLE 4

| | | Example for Comparison 2 | | | | | |
|---|---|---|---|---|---|---|---|
| | | Vertical coordinates | | | | | |
| | | 350.5 | | | 0.0 | | |
| | | Horizontal coordinates | | | | | |
| | | 0 | 233.7 | 467.4 | 0 | 233.7 | 467.4 |
| Red | Angle of radiation H | 8.81 | 7.42 | 5.93 | 9.5 | 7.99 | 6.38 |
| | Angle of radiation V | −1.52 | −1.25 | −1.13 | 0 | 0 | 0 |
| | Reflection loss | 9.05 | 9.19 | 10.49 | 8.38 | 8.46 | 9.27 |
| Green | Angle of radiation H | 0 | −0.67 | −1.34 | 0 | −0.67 | −1.34 |
| | Angle of radiation V | −1 | −1 | −1 | 0 | 0 | 0 |
| | Reflection loss | 8.94 | 9.46 | 11.52 | 8.38 | 8.51 | 9.91 |
| Blue | Angle of radiation H | −8.81 | −10.01 | −11.17 | −9.5 | −10.91 | −12.03 |
| | Angle of radiation V | −1.52 | −1.85 | −2.07 | 0 | 0 | 0 |
| | Reflection loss | 9.05 | 10.4 | 15.27 | 8.38 | 8.86 | 12.66 |

The radiation-angle tangents of the actual example as well as Example for Comparison 1 and 2 described above were measured to give results shown in FIGS. 19 (a) to (c). The case of a green projection beam was taken as an example.

As shown in FIGS. 19 (a) to (c), the radiation-angle tangents of the projection screen provided by the present invention indicate that the horizontal-direction optical axes form a nearly parallel optical system over the entire screen in comparison to Examples for Comparison 1 and 2. In addition, the radiation-angle tangents at the diagonal ends of the edges of the projection screen have values close to those of the circular Fresnel lens sheet of Example for Comparison 2.

In the case of Actual Example 1, the equation of the focal point described above was used. It should be noted, however, that the present invention does not limit formulas for the focal point to the equation. Another equation can also be used as far as the equation does not deviate from the gists of the present invention.

It is obvious from the description given so far that the projection screen provided by the present comprises three lens sheets: a horizontal-direction refracting linear Fresnel lens sheet, a vertical-direction refracting linear Fresnel lens sheet and a light diffusing lenticular lens sheet for diverging a projection beam. The horizontal-direction refracting linear Fresnel lens sheet for refracting a projection beam mainly in the horizontal direction has a ridge line extending in the vertical direction. The vertical-direction refracting linear Fresnel lens sheet for refracting a projection beam mainly in the vertical direction, on the other hand, has a ridge line extending in the horizontal direction. The horizontal-direction refracting linear Fresnel lens sheet forms a divergence system at the outermost portions on the horizontal axis including the center of the screen. Since radiated beams form a convergence system at the top and bottom portions of the screen, almost parallel optical systems are formed at the rightmost and leftmost portions of the screen. After all, the screen as a whole forms an almost parallel optical system.

Accordingly, the amount of reflection loss as well as the differences in reflection loss among the RGB colors can be reduced and the picture quality can be improved by reducing the number of defects deteriorating the picture quality such as the color variance and the shading, a phenomenon in which the edges of the screen look dark.

In addition, a single formation metal pattern can be used for manufacturing both the horizontal-direction refracting linear Fresnel lens sheet and the vertical-direction refracting linear Fresnel lens sheet. As a result, economical fabrication processes can be implemented.

Figure 20:
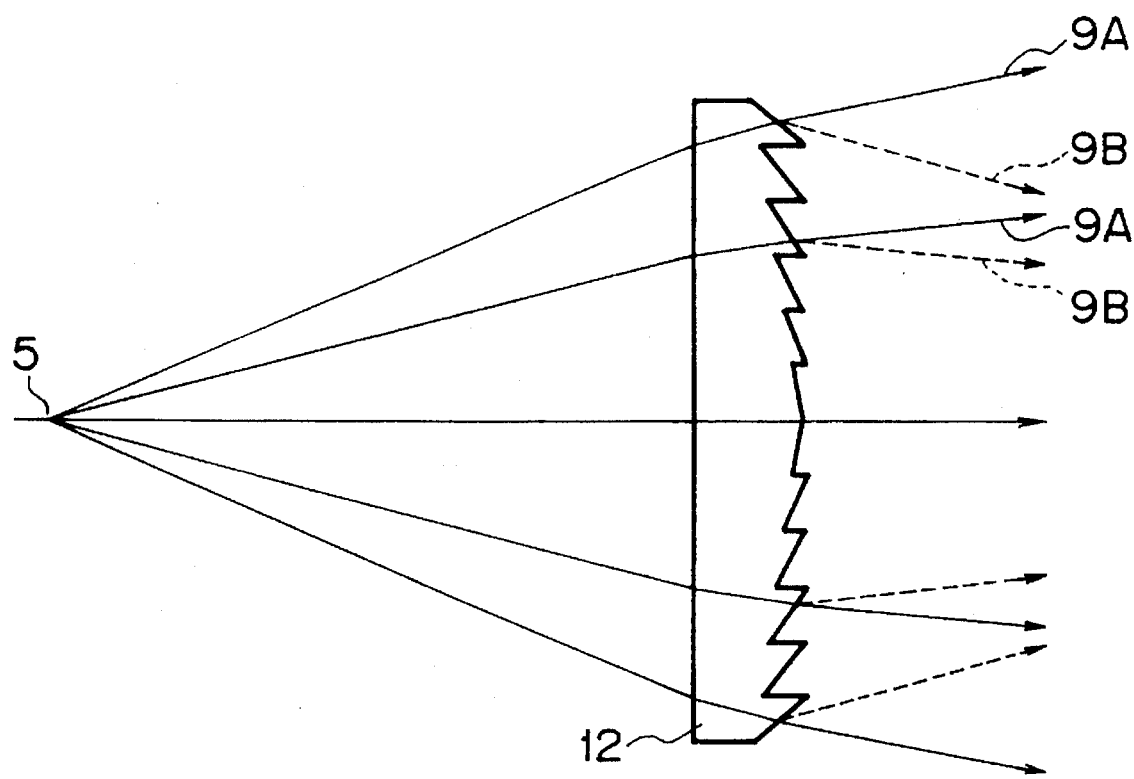
FIG. 20 is a top view of a horizontal-direction refracting linear Fresnel lens sheet provided by the present invention showing radiation directions of beams.
Figure 21A:
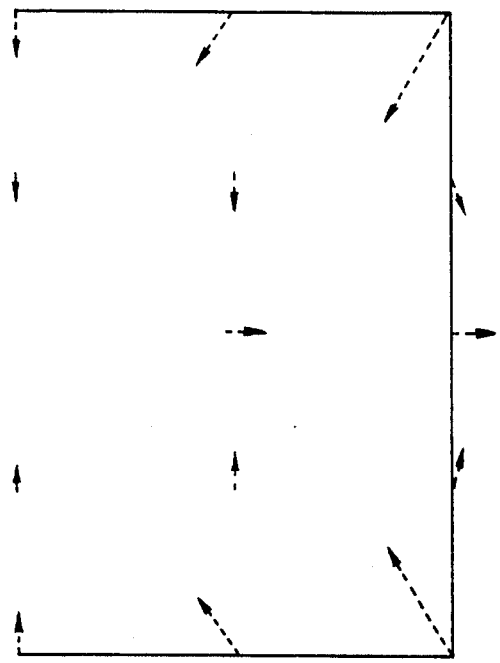
FIGS. 21(a) 21(c) are a diagram (FIG. 21(a)) showing measurement results of the radiation-angle tangent of the green beam for the embodiment provided by the present invention as well as projection screens (FIGS. 21(b) and 21(c)) described in Examples for Comparison 3 and 4.
Figure 21B:
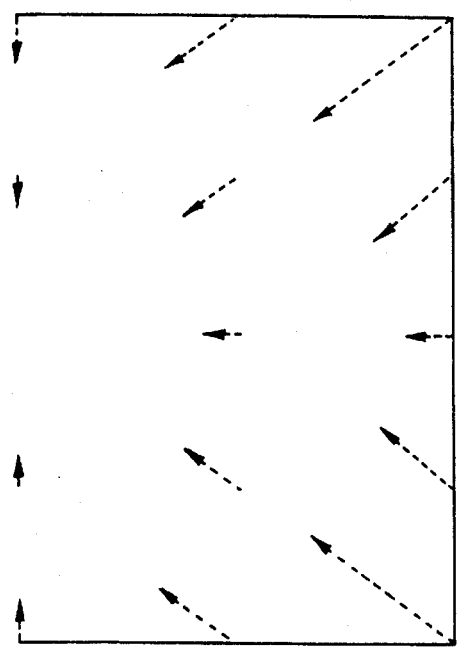
Figure 21C:
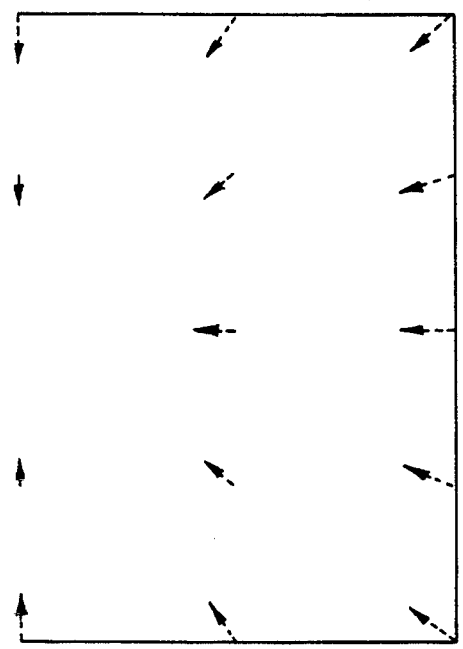

Next, still another embodiment is explained by referring to FIGS. 20 and 21. Basically, the embodiment shown in FIG. 20 has the same configuration as the projection screen 10 implemented by the embodiment shown in FIG. 1. Accordingly, the following description is given by referring to FIG. 1.

FIG. 20 is a top view of a horizontal-direction refracting linear Fresnel lens sheet 12 provided by the present invention showing radiation directions of beams. Generated by a light source 5, the beams pass the horizontal-direction refracting linear Fresnel lens sheet 12. A solid-line arrow 9A shown in the figure denotes a radiation direction of a beam on an axis for which the lens angle of a vertical-direction refracting linear Fresnel lens sheet 14 is zero. In other words, the solid-line arrow 9A normally denotes a radiation direction of on a horizontal surface passing through an area in close proximity to the center of the projection screen. A solid-line arrow 9B shown in the figure, on the other hand, denotes a radiation direction of a beam at a position for which the lens angle of the vertical-direction refracting linear Fresnel lens sheet 14 has a maximum value. In other words, the solid-line arrow 9B normally denotes a radiation direction on a horizontal surface passing through an area in close proximity to the upper or lower end of the projection screen.

That is to say, the radiation directions of beams of the horizontal-direction refracting linear Fresnel lens sheet used in the present invention are divergent on the horizontal surface passing through an area in close proximity to the center of the projection screen as indicated by solid lines. However, the radiation directions of beams of the horizontal-direction refracting linear Fresnel lens sheet used in the present invention are convergent on the horizontal surfaces passing through an area in close proximity to the upper and lower ends of the projection screen as indicated by dashed lines.

Furthermore, in the present invention, the vertical-direction linear Fresnel lens sheet has a reflection power stronger than that of the horizontal-direction linear Fresnel lens sheet. In other words, the vertical-direction linear Fresnel lens sheet and the horizontal-direction linear Fresnel lens sheet are configured to form an optical system wherein beams on a vertical surface passing through the vertical-direction linear Fresnel lens sheet are either convergent or parallel to each other.

None the less, the vertical-direction linear Fresnel lens sheet and the horizontal-direction linear Fresnel lens sheet are made of the same material and have the same thickness as the embodiment shown in FIGS. 18 and 19.

Likewise, a group of prismatic unit lenses are created on the surface of a transparent material in parallel to each other by using the same technique as that for the embodiment shown in FIGS. 18 and 19.

The configuration, materials for making the lenticular lens sheet employed in the embodiment and its manufacturing technique are the same as those for the embodiment shown in FIGS. 18 and 19.

Next, desirable versions of the embodiments provided by the present invention are explained by giving some actual examples.

(Actual Example)

A projection screen provided by the present invention satisfying the following conditions was manufactured.
o The size of the projection size
   46 inches (NTSC)
o The aspect ratio of the projection size
   3 : 4
o The focal distance on a vertical surface passing through the center of the vertical-direction refracting linear Fresnel lens sheet
   20,000 mm
o The focal distance on a vertical surface passing through the center of the horizontal-direction refracting linear Fresnel lens sheet
   25,000 mm
o Projection distance
   869 mm (The same position as f1)
o CRT convergence angle
   9.5 degrees
o The refraction index of the lens unit of the linear Fresnel lens sheet
   1.55 o The refraction index of the basic material of the linear Fresnel lens sheet
   1.49

(Example for Comparison 3)

As an example for comparison 3, a projection screen was manufactured under the following conditions:

The optical system of the horizontal-direction refracting linear Fresnel lens sheet was set to have the same value as the vertical-direction refracting linear Fresnel lens sheet. The other conditions were the same as those of the actual example.

(Example for Comparison 4)

As an example for comparison 4, a projection screen was manufactured under the following conditions:

As a substitute for the vertical-direction refracting linear Fresnel lens sheet and the horizontal-direction refracting linear Fresnel lens sheet, circular Fresnel lens sheets each having a focal distance of 20,000 mm were used. The other conditions were the same as those of the actual example.

The optical characteristics of the actual example as well as Examples for Comparison 3 and 4 described above were measured to give results shown in Tables 5 to 7 given below.

In the case of a projection tube located on the optical axis of a projection screen employing a vertical-direction refracting linear Fresnel lens sheet and a horizontal-direction refracting linear Fresnel lens sheet, a picture projected on the screen can be assumed to be symmetrical to the vertical and horizontal central lines of the screen. Accordingly, only the upper portion on the right side and the middle portion on the right side of the projection screen seen from the observer's side are shown in Tables 5 to 7. It is obvious from Tables 5 to 7 that, as a whole, the actual example incurs reflection loss less than that of Example for Comparison 3.

In addition, the smaller the difference between the RGB maximum and minimum values, the less the reflection loss. The difference may vary from position to position. In this case, the smoother the variation in difference, the less the reflection loss. Since the actual example has a small difference between RGBs at the same location and a small difference dependent upon the position of each color, the actual example provides results better than those of Examples for Comparison 3 and 4.

The radiation-angle tangents of the actual example as well as Example for Comparison 3 and 4 described above were measured to give results shown in FIGS. 21 (a) to (c). The case of a green projection beam was taken as an example.

As shown in FIGS. 21 (a) to (c), the radiation-angle tangents of the projection screen provided by the present invention indicate that the horizontal-direction optical axes form a nearly parallel optical system over the entire screen in comparison to Examples for Comparison 3 and 4. In addition, the radiation-angle tangents at the diagonal ends of the edges of the projection screen have values close to those of the circular Fresnel lens sheet of Example for Comparison 4.

TABLE 5

| | | \multicolumn{6}{c}{Actual Example 2} |
|---|---|---|---|---|---|---|---|
| | | \multicolumn{6}{c}{Vertical coordinates} |
| | | \multicolumn{3}{c}{350.52} | \multicolumn{3}{c}{0.0} |
| | | \multicolumn{6}{c}{Horizontal coordinates} |
| | | 0 | 234 | 467 | 0 | 234 | 467 |
| Red | Angle of radiation H | 8.81 | 6.96 | 5.49 | 9.5 | 9.08 | 8.4 |
| | Angle of radiation V | −1.52 | −3.1 | −5.52 | 0 | 0 | 0 |
| | Reflecttion loss | 16.77 | 16.98 | 18.03 | 16.06 | 16.12 | 16.65 |
| Green | Angle of radiation H | 0 | −1.29 | −2.15 | 0 | 0.54 | 0.72 |
| | Angle of radiation V | −1 | −1.81 | −3.86 | 0 | 0 | 0 |
| | Reflection loss | 16.65 | 16.94 | 18.51 | 16.06 | 16.13 | 16.92 |
| Blue | Angle of radiation H | −8.81 | −10.85 | −12.45 | −9.5 | −9.47 | −8.71 |
| | Angle of radiation V | −1.52 | −1.43 | −2.92 | 0 | 0 | 0 |
| | Reflection loss | 16.77 | 17.45 | 21.27 | 16.06 | 16.35 | 18.25 |

TABLE 6

| | | \multicolumn{6}{c}{Example for Comparison 3} |
|---|---|---|---|---|---|---|---|
| | | \multicolumn{6}{c}{Vertical coordinates} |
| | | \multicolumn{3}{c}{350.52} | \multicolumn{3}{c}{0.0} |
| | | \multicolumn{6}{c}{Horizontal coordinates} |
| | | 0 | 234 | 467 | 0 | 234 | 467 |
| Red | Angle of radiation H | 8.81 | 5.8 | 3.27 | 9.5 | 7.99 | 6.38 |
| | Angle of radiation V | −1.52 | −3.05 | −5.46 | 0 | 0 | 0 |
| | Reflection loss | 16.77 | 17 | 18.41 | 16.06 | 16.13 | 16.88 |
| Green | Angle of radiation H | 0 | −2.58 | −4.91 | 0 | −0.67 | −1.34 |
| | Angle of radiation V | −1 | −1.82 | −3.92 | 0 | 0 | 0 |
| | Reflection loss | 16.65 | 17.04 | 19.54 | 16.06 | 16.17 | 17.46 |
| Blue | Angle of radiation H | −8.81 | −12.41 | −16.63 | −9.5 | −10.91 | −12.03 |
| | Angle of radiation V | −1.52 | −1.53 | −3.29 | 0 | 0 | 0 |
| | Reflection loss | 16.77 | 17.78 | 25.14 | 16.06 | 16.5 | 19.98 |

Figure 22:
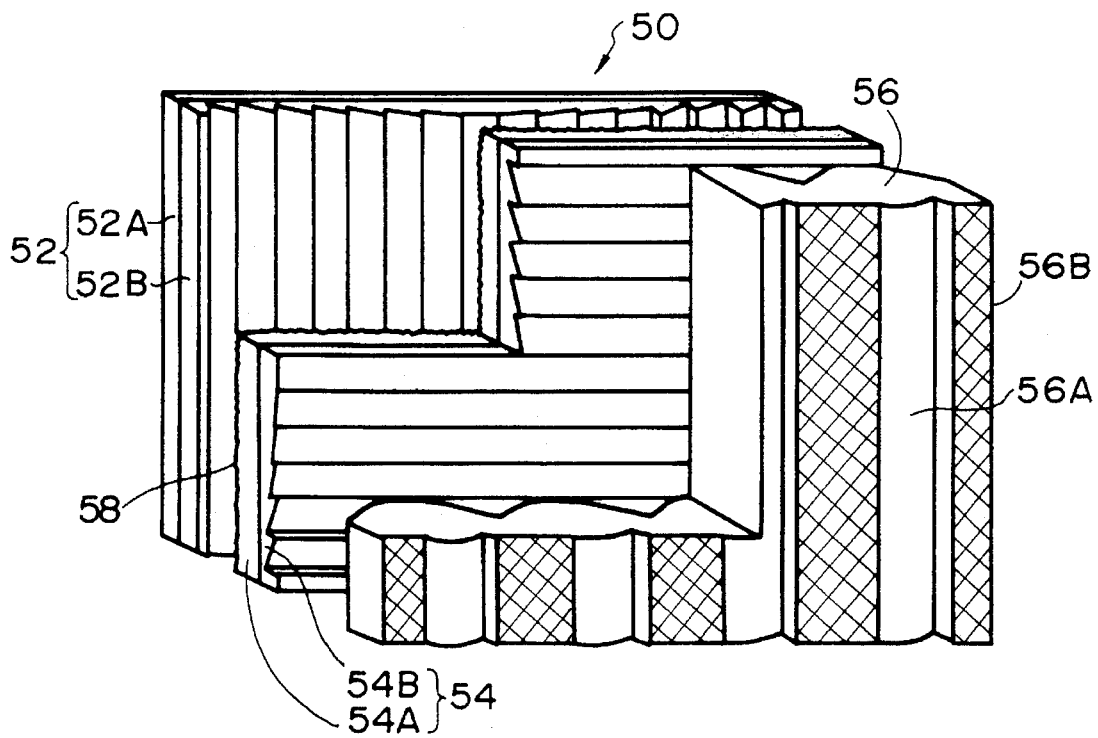
FIG. 22 is a diagram showing a squint view of some cross sections of principal elements of an embodiment implementing a projection screen in accordance with the present invention.
Figure 23:
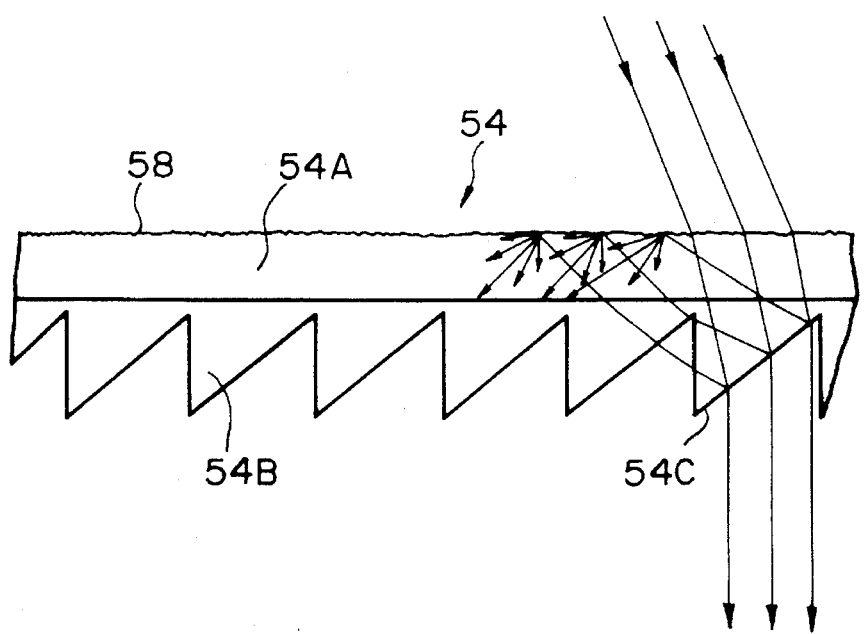
FIG. 23 is an enlarged cross-sectional diagram of principal elements of the embodiment showing relations between incident beams, radiated beams and internally reflected beams.

Next, still another embodiment is explained by referring to FIGS. 22 and 23.

The embodiment shown in FIG. 22 is an embodiment of a projection screen 50 for rear-projection TV sets comprising a horizontal refracting linear Fresnel lens sheet 52, a vertical refracting linear Fresnel lens sheet 54 and a beam diverging lenticular lens sheet 56, which are arranged from the beam-projection side starting with the horizontal refracting linear Fresnel lens sheet 52 followed by the vertical refracting linear Fresnel lens sheet 54 and ending with the light diffusing lenticular lens sheet 56 to form an HVL type. The incidence surface of the vertical refracting linear Fresnel lens sheet 54 is a surface 58 created by means of a mat process.

The horizontal refracting linear Fresnel lens sheet 52 comprises a polyester base film 52A and a Fresnel lens unit 52B created on the polyester base film 52A. The Fresnel lens unit 52B is a hardened substance made of ultraviolet-ray hardened resin of the urethane acrylate family. Similarly, the horizontal refracting linear Fresnel lens sheet 54 comprises a polyester base film 54A and a Fresnel lens unit 54B created on the polyester base film 54A. The Fresnel lens unit 54B is also a hardened substance made of ultraviolet-ray hardened resin of the urethane acrylate family.

An output-beam surface 56A of the lenticular lens sheet 56 comprises lenticular lenses and protrusions each for creating a beam shielding layer. The lenticular lenses and the shielding-layer creating protrusions are laid out alternately with each other. Furthermore, a beam shielding layer 56B is formed on each of the shielding-layer creating protrusions by means of black ink.

Since the horizontal refracting linear Fresnel lens sheet 52, the vertical refracting linear Fresnel lens sheet 54 and the lenticular lens sheet 56 are each a flexible film sheet, a projection screen comprising even these combined three sheets does not have self-supported mechanical strength. Accordingly, by also including a transparent resin plate in the combination held by a common frame, the combination of the lens sheets is strengthened. As a result, the frame-held combination of the sheets has structural strength required for independence or the like as well as strength for withstanding surface friction, etc. It should be noted that the common frame itself is not shown in the figure.

The mat-processed surface 58 created on the vertical refracting linear Fresnel lens sheet 54 is a surface for diffusing light. Therefore, the mat-processed surface 58 is created on the vertical refracting linear Fresnel lens sheet 54 is a surface created by making the surface of the vertical refracting linear Fresnel lens sheet 54 rough or applying light diffusing link on the surface. As an alternative, the mat-processed surface 58 is created on the vertical refracting linear Fresnel lens sheet 54 by coating the surface thereof with paint.

Next, effects of the embodiment are explained by referring to FIG. 23.

As shown in the figure, beams projected from the projector pass through the horizontal refracting linear Fresnel lens sheet 52, entering the vertical refracting linear Fresnel lens sheet 54 from the smooth surface of the vertical refracting linear Fresnel lens sheet 54. In the vertical refracting linear Fresnel lens sheet 54, the beams are refracted before being radiated out off a Fresnel lens unit 54B. However, some of the beams are reflected at a boundary surface 54C between the lens unit 54B and the air. The reflected beams are returned to the inside of the vertical refracting linear Fresnel lens sheet 54, becoming stray beams.

When a stray beam described above is reflected again by the incidence surface of a base film 54A, it is diverged by the mat-processed surface 58. Accordingly, an area on the Fresnel lens unit 54B from which beams are radiated to the outside is widened. As a result, the radiation of locally strong stray beams vanishes, making the stray beams difficult to observe.

A white band expanding in the horizontal direction caused by a stray beam, which is attributed to the vertical refracting linear Fresnel lens sheet, is eliminated or weakened.

Figure 24:
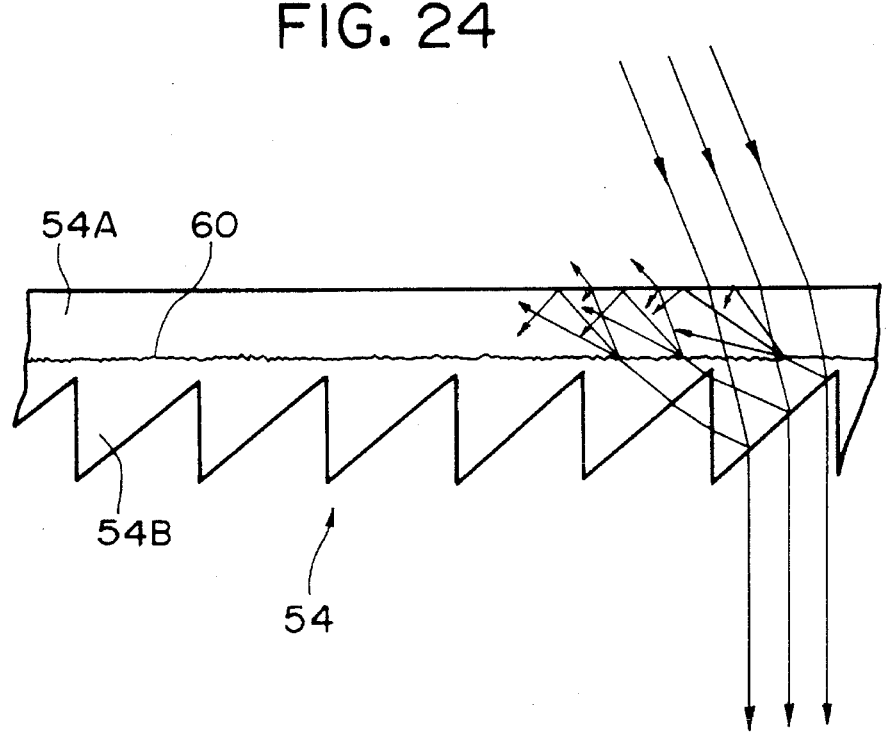
FIG. 24 is a cross-sectional diagram similar to FIG. 23 for another embodiment.

Next, another embodiment provided by the present invention is explained by referring to FIG. 24.

In the case of the embodiment shown in the figure, a mat-processed surface 60 serves as a boundary between a vertical refracting linear Fresnel lens sheet 54 and a base film 54A. The mat-processed surface is created by carrying out mat processing on the base film 54A in advance prior to a process of hardening a Fresnel lens unit 54B.

Also in this embodiment, an internally reflected beam is diverged by the mat-processed surface 60 on the incidence-side of the Fresnel lens unit 54B. As a result, a white band in the radiated beam becomes difficult to observe as in the case with the previous embodiment shown in FIG. 22.

Figure 25:
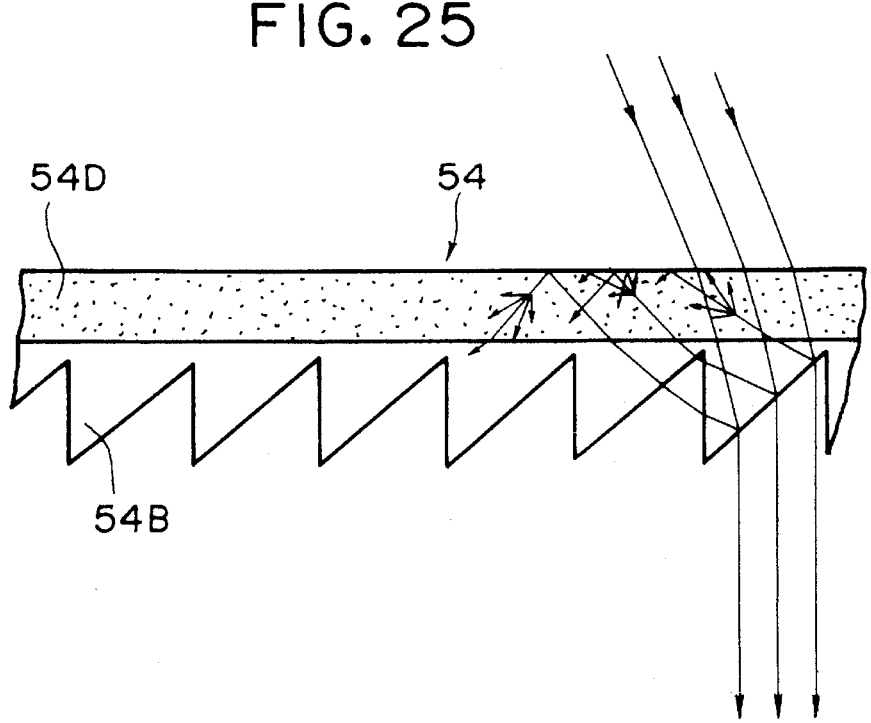
FIG. 25 is a cross-sectional diagram similar to FIG. 23 for still another embodiment.

Much like the mat-processed surface 58, the mat-processed surface 60 is created on the vertical refracting linear Fresnel lens sheet 54 by coating the surface thereof with light diffusing ink or paint. In the present invention, the mat-processed surface can be any surface as long as it diverges an internally reflected beam on the incidence side of the Fresnel lens unit 54B. For example, in the case of another embodiment shown in FIG. 25, a base film 54D containing a mixed light diffusing material can be used on a vertical refracting linear Fresnel lens sheet 54 as a mat-processed surface.

Figure 26:
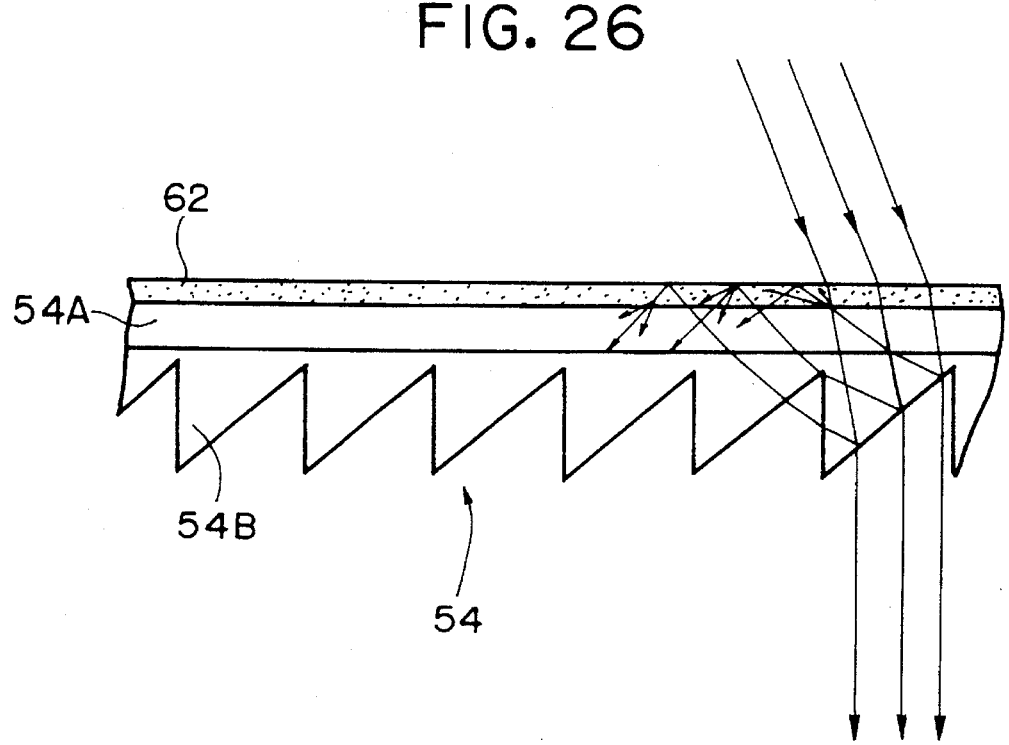
FIG. 26 is a cross-sectional diagram similar to FIG. 23 for yet another embodiment.

Another example of the mat-processed surface is shown in an embodiment of FIG. 26 wherein, on the beam-incidence surface side of a base film 54A of a vertical refracting linear Fresnel lens sheet 54, a beam diffusing film 62 is laminated to create a mat-processed surface.

Figure 27:
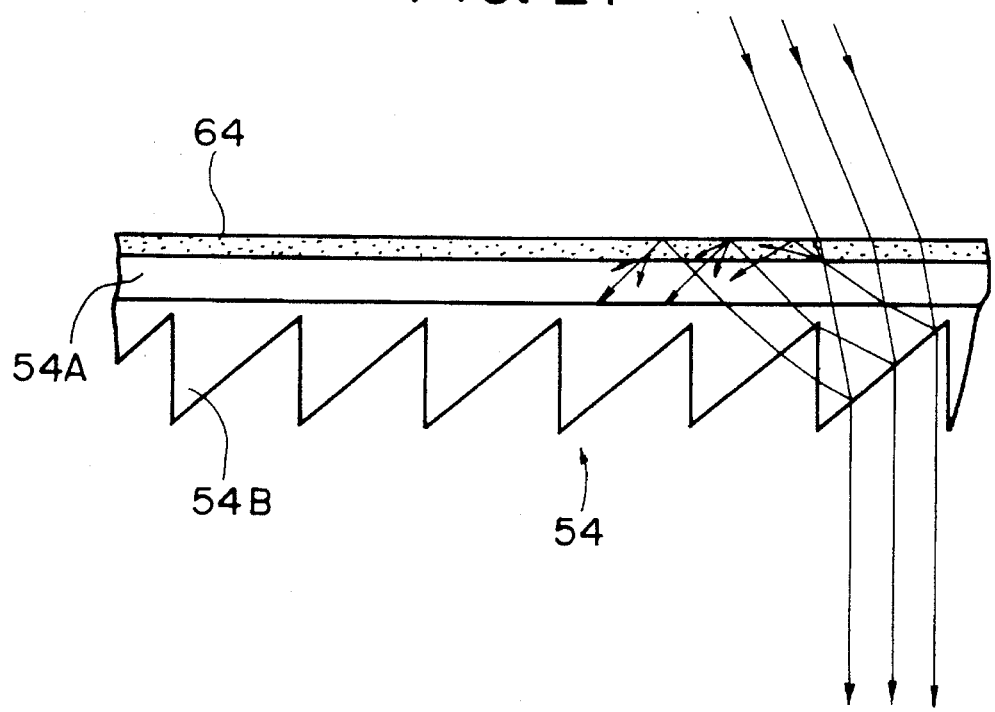
FIG. 27 is a cross-sectional diagram similar to FIG. 23 for still another embodiment.

Still another example of the mat-processed surface is shown in an embodiment of FIG. 27 wherein, the beam-incidence surface side of a base film 54A is coated with a light diffusing layer 64 to create a mat-processed surface.

Furthermore, two or more mat-processing means described above can be combined to create a mat-processed surface for diverging an internally reflected beam.

In the case of the light diffusing film 62 laminated on the base film 54A or the base film 54A coated with the light diffusing layer 64 as described above, the resulting refraction index must be smaller than that of the base film 54A.

In addition, since a light diffusing layer is provided on the vertical refracting linear Fresnel lens sheet 54, a projection beam is diverged by two sheets: the vertical refracting linear Fresnel lens sheet 54 and the lenticular lens sheet 56. However, a big gap separating the lenticular lens sheet 56 from the light diffusing layer on the vertical refracting linear Fresnel lens sheet 54 will decrease the resolution. It is therefore desirable to employ the filmy vertical refracting linear Fresnel lens sheet 54 instead of a plate vertical refracting linear Fresnel lens sheet as in the case with the embodiments provided by the present invention.

Due to the diffusion by the vertical refracting linear Fresnel lens sheet 54, material properties of the base film, the degree to which the light is diffused, the technique of creating mat-processed surface and other factors can make a produced picture somewhat white, deteriorating the contrast. In this case, as an effective countermeasure, the light diffusing power of the lenticular lens sheet 56 is reduced by as much as the amount of diffusion by the linear Fresnel lens sheet. As an alternative countermeasure, a color is laid on the vertical refracting linear Fresnel lens sheet 54 or the lenticular lens sheet 56.

In addition, when a combination of horizontal and vertical refracting linear Fresnel lens sheets is used, there is generally probability that moire fringes are generated between the horizontal refracting linear Fresnel lens sheet and the lenticular lens sheet. By providing the vertical refracting linear Fresnel lens sheet 54 with a light diffusing function as in the case with the present invention, however, the number of generated moire fringes can be decreased. In addition, there is also probability that lines are introduced in a picture at the center of the lens sheet due to the cutting technique of the matrix metal pattern and the cutting accuracy for both the horizontal and vertical refracting linear Fresnel lens sheets. By providing the vertical refracting linear Fresnel lens sheet 54 with a light diffusing layer described above for diverging an internally reflected beam as in the case with the present invention, however, the lines appearing at the center can be made hardly visible.

As described above, white bands may be seen in a picture on the projection screen which are caused by stray beams generated as a result of internal reflection of beams on the boundary between the lens and the air. Since the embodiments provided by the present invention are configured as described above, however, the number of white bands is reduced by the fact that the horizontal and vertical refracting linear Fresnel lens sheets constituting the projection screen cross each other perpendicularly.

Figure 28:
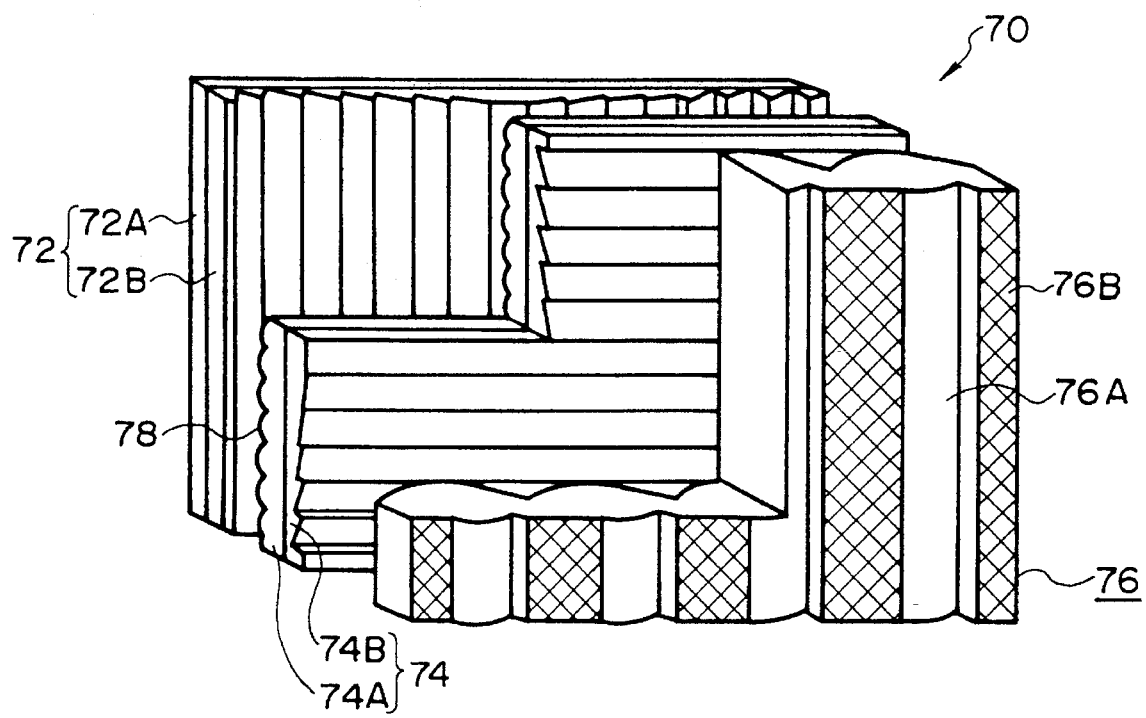
FIG. 28 is a diagram showing a squint view of some cross sections of principal elements of an embodiment implementing a projection screen in accordance with the present invention.

Next, still another embodiment is explained by referring to FIG. 28.

The embodiment shown in FIG. 28 is an embodiment of a projection screen 70 for rear-projection TV sets comprising a horizontal refracting linear Fresnel lens sheet 72, a vertical refracting linear Fresnel lens sheet 74 and a light diffusing lenticular lens sheet 76, which are arranged starting from the beam-projection side with the horizontal refracting linear Fresnel lens sheet 72 followed by the vertical refracting linear Fresnel lens sheet 74 and ending with the light diffusing lenticular lens sheet 76 to form an HVL type. Microlenticular lenses 78 are created on the beam-incidence-surface side of the vertical linear refracting lens sheet 74 in parallel to a group of linear Fresnel lenses. The microlenticular lenses 78 are each referred to hereafter as a V lenticular lens.

The horizontal refracting linear Fresnel lens sheet 72 comprises a polyester base film 72A and a Fresnel lens unit 72B created on the polyester base film 72A. The Fresnel lens unit 72B is a hardened substance made of ultraviolet-ray-tray hardened resin of the urethane acrylate family. Similarly, the horizontal refracting linear Fresnel lens sheet 74 comprises a polyester base film 74A and a Fresnel lens unit 74B created on the polyester base film 74A. The Fresnel lens unit 74B is also a hardened substance made of ultraviolet-ray hardened resin of the urethane acrylate family.

Furthermore, an output-beam surface 76A of the lenticular lens sheet 76 comprises lenticular lenses and protrusions each for creating a beam shielding layer. The lenticular lenses and the shielding-layer creating protrusions are laid out alternately with each other. Furthermore, a beam shielding layer 76B is formed on each of the shielding-layer creating protrusions by means of black ink.

Since the horizontal refracting linear Fresnel lens sheet 72, the vertical refracting linear Fresnel lens sheet 74 and the lenticular lens sheet 76 are each a flexible film sheet, a projection screen comprising even these combined three sheets does not have self-supported mechanical strength. Accordingly, by also including a transparent resin plate in the combination held by a common frame, the combination of the lens sheets is strengthened. As a result, the frame-held combination of the sheets has structural strength required for independence or the like as well as strength for withstanding surface friction, etc. It should be noted that the common frame itself is not shown in the figure.

Figure 29:
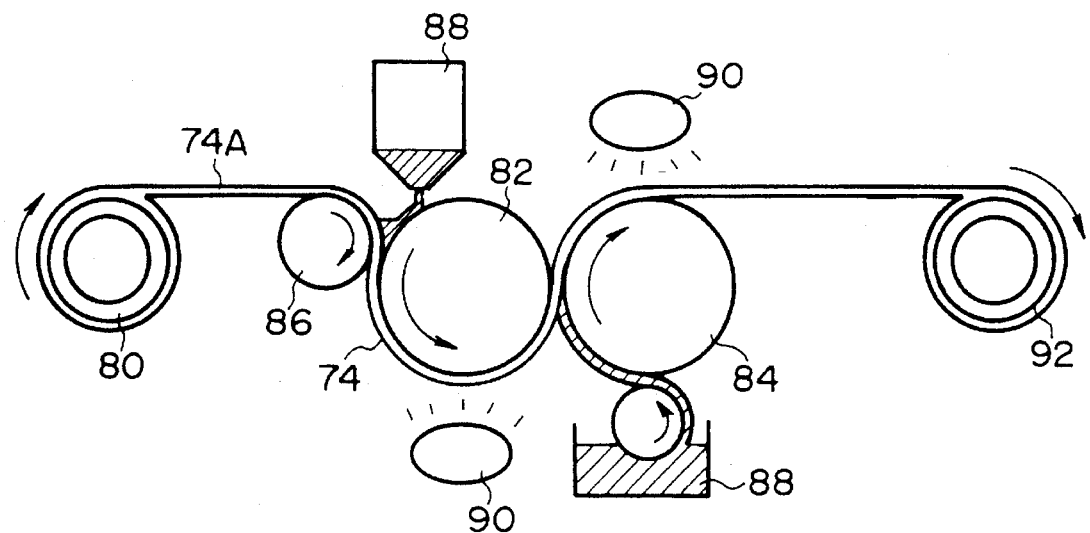
FIG. 29 is a rough cross-sectional diagram showing a process of manufacturing a linear Fresnel lens sheet employed in the embodiment.

The V lenticular lenses 78 created on the vertical refracting linear Fresnel lens sheet 74 are manufactured by a method shown in FIG. 29. As shown in the figure, a vertical refracting linear Fresnel lens sheet 74 is formed on a base film 74A sent from a material roll 80 by a first molding roll 82 using an ultraviolet-beam hardening technique or an radiation hardening technique. Then, a V lenticular lens 78 is created thereon by means of a second molding roll 84. A horizontal refracting linear Fresnel lens sheet which does not have a V lenticular lens 78 can be created by eliminating the process using the second molding roll 84.

Reference numerals 86, 88, 90 and 92 denote a nip roll, UV resin, a UV lamp and a take-up reel respectively.

Figure 30:
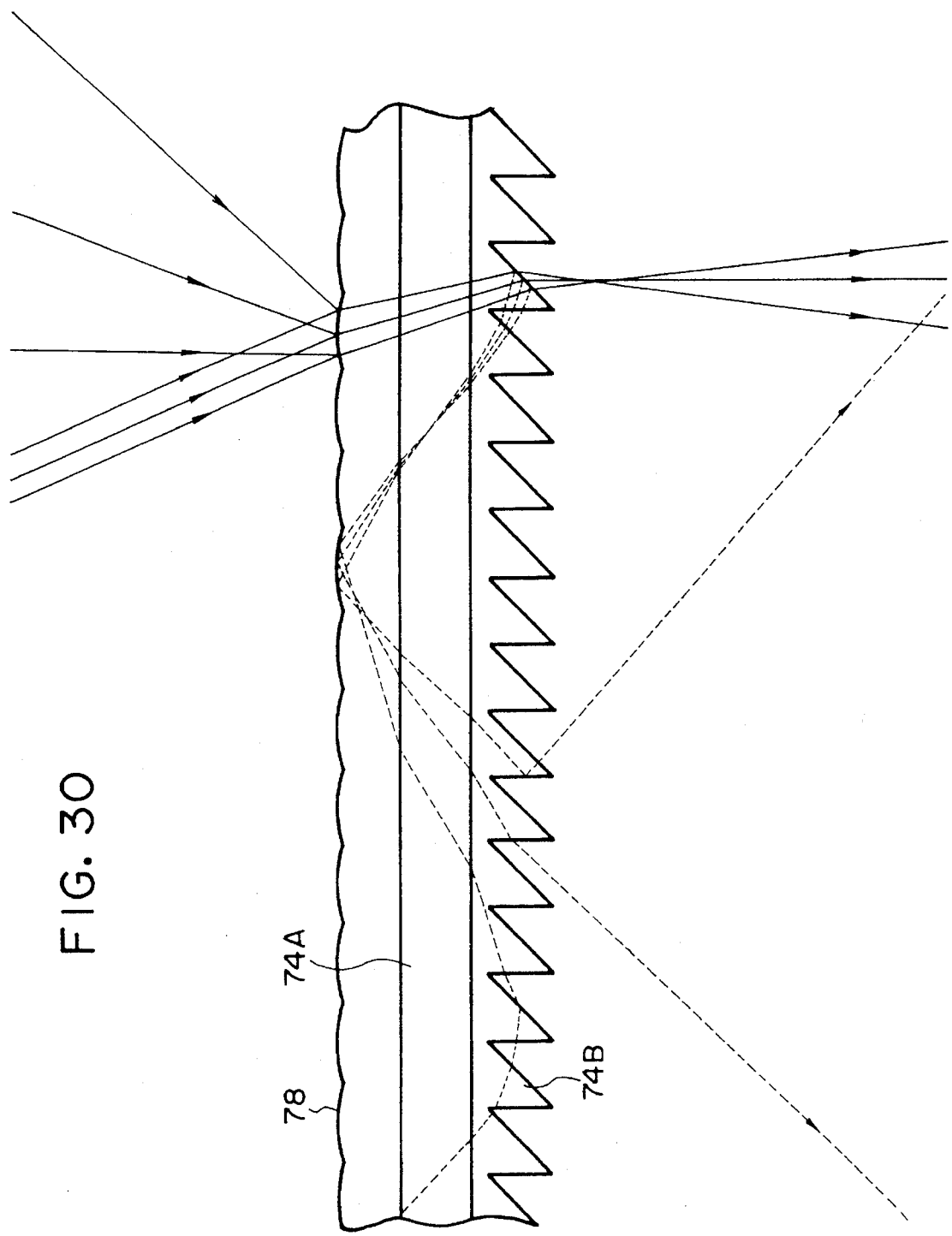
FIG. 30 is an enlarged cross-sectional diagram of principal elements of the embodiment showing relations between incident beams, radiated beams and internally reflected beams.

Next, effects of the embodiment are explained by referring to FIG. 30.

As shown in the figure, beams projected from the projector pass through the horizontal refracting linear Fresnel lens sheet 72, entering the vertical refracting linear Fresnel lens sheet 74. In the vertical refracting linear Fresnel lens sheet 74, the beams are refracted before being radiated out off a Fresnel lens unit 74B. However, some of the beams are reflected at a boundary surface 74C between the lens unit 74B and the air. The reflected beams are returned to the inside of the vertical refracting linear Fresnel lens sheet 74, becoming stray beams.

When a stray beam described above is reflected again by the incidence surface of a base film 74A, it is diffused by another V lenticular lens 78. Accordingly, an area on the Fresnel unit 74B from which beams are radiated to the outside is widened. As a result, the radiation of locally strong stray beams vanishes, making the stray beams difficult to observe.

A white band expanding in the horizontal direction caused by a stray beam, which is attributed to the vertical refracting linear Fresnel lens sheet, is eliminated or weakened.

Here, if possible, it is desirable to have a V lenticular lens with a resulting refraction index smaller than that of the base film. This is because, the lower the refraction index of the V lenticular lens, the higher the efficiency of the utilization of the projection beam and, at the same time, the more easily a stray beam gets to the projection side.

In addition, when linear Fresnel lens sheets provided by the present invention are used in the vertical and horizontal directions, there is generally probability that moire fringes are generated between the horizontal refracting linear Fresnel lens sheet and the lenticular sheet. By providing the vertical refracting linear Fresnel lens sheet with microlenticular lenses as in the case with the present invention, however, the number of generated moire fringes can be decreased. In the case of a circular Fresnel lens, moire fringes generated between the V lenticular lens and the circular Fresnel lens can be made hardly visible by selection of a proper pitch ratio even though, as a rule, it is impossible to completely eliminate moire fringes. None the less, moire fringes between the vertical refracting linear Fresnel lens sheet and the V lenticular lens can be perfectly synchronized with each other by registration of lenses on the incidence and radiation sides. As a result, it is possible to prevent moire fringes from being generated.

In addition, the diffusing characteristic of the V lenticular lens created on the incidence-surface side of the circular Fresnel lens results in, to a certain degree, a difference in effect of diffusion by the V lenticular lens between the center and the left/right portions of the screen. The difference in such effect is due to the nonlinearity in accordance with Snell's law. By creating the V lenticular lenses on the incidence-surface side of the vertical-direction refracting linear Fresnel lens sheet, however, the beam is diffused after passing through the horizontal refracting linear Fresnel lens sheet. On top of that, the V lenticular lenses exist synchronously with the linear Fresnel lenses. As a result, the positional dependence of the diffusion characteristic of the V lenticular lenses is less than that of the circular Fresnel lenses.

As an optical system employing linear Fresnel lenses, it is desirable to have a linear Fresnel lens sheet for refraction of beams in the vertical direction with a refraction index lower than that of the linear Fresnel lens sheet for convergence of beams in the horizontal direction. Accordingly, a PET with a refraction index greater than 1.6 is typically used as a base film while a UV resin of the urethane acrylate family having a high refraction index in the range 1.55 to 1.57, or even greater, can be used for creating the horizontal-direction refracting linear Fresnel lens sheet with a lens unit having a high refraction index. On the other hand, a UV resin of the urethane acrylate family having an ordinary refraction index of about 1.49 can be used for creating the vertical-direction refracting linear Fresnel lens sheet and the V lenticular lenses on the incidence surface of the vertical-direction refracting linear Fresnel lens sheet. In this case, a patternless formation process, a coating process or the like using a resin with an even lower refraction index can be carried out on the incidence-surface side of the horizontal-direction refracting linear Fresnel lens sheet.

What is claimed is:

1. A projection screen for rear-projection TV sets characterized in that said projection screen comprises three or more screen sheets: a horizontal refracting linear Fresnel lens sheet for refracting a projection beam mainly in a horizontal direction wherein a ridge line of said horizontal refracting linear Fresnel lens sheet extends in a vertical direction, a vertical refracting linear Fresnel lens sheet for refracting a projection beam mainly in said vertical direction wherein a ridge line of said vertical refracting linear Fresnel lens sheet extends in said horizontal direction, and a light diffusing lenticular lens sheet, which are arranged starting from a beam-projection side, with said horizontal refracting linear Fresnel lens sheet followed by said vertical refracting linear Fresnel lens sheet and ending with said light diffusing lenticular lens sheet, wherein at least one of said horizontal refracting linear Fresnel lens sheet and said vertical refracting linear Fresnel lens sheet is made of ultraviolet-beam hardened resin.

2. A projection screen according to claim 1 characterized in that said Fresnel lens unit is created on a filmy base material.

3. A projection screen for rear-projection TV sets characterized in that said projection screen comprises three or more screen sheets: a horizontal refracting linear Fresnel lens sheet for refracting a projection beam mainly in a horizontal direction wherein a ridge line of said horizontal refracting linear Fresnel lens sheet extends in a vertical direction, a vertical refracting linear Fresnel lens sheet for refracting a projection beam mainly in said vertical direction wherein a ridge line of said vertical refracting linear Fresnel lens sheet extends in said horizontal direction., and a light diffusing lenticular lens sheet, which are arranged starting from a beam-projection side with said horizontal refracting linear Fresnel lens sheet followed by said vertical refracting linear Fresnel lens sheet and ending with said light diffusing lenticular lens sheet, wherein a fourth sheet is placed on a side closest to a watcher in order to increase mechanical strength of said three sheets.

4. A projection screen for rear-projection TV sets characterized in that said projection screen comprises three or more screen sheets: a horizontal refracting linear Fresnel lens sheet for refracting a projection beam mainly in a horizontal direction wherein a ridge line of said horizontal refracting linear Fresnel lens sheet extends in a vertical direction, a vertical refracting linear Fresnel lens sheet for refracting a projection beam mainly in said vertical direction wherein a ridge line of said vertical refracting linear Fresnel lens sheet extends in said horizontal direction, and a light diffusing lenticular lens sheet, which are arranged starting from a beam-projection side with said horizontal refracting linear Fresnel lens sheet followed by said vertical refracting linear Fresnel lens sheet and ending with said light diffusing lenticular lens sheet, wherein a refraction index of said horizontal refracting linear Fresnel lens sheet is made greater than a refraction index of said vertical refracting linear Fresnel lens sheet.

5. A projection screen for rear-projection TV sets characterized in that said projection screen comprises three or more screen sheets: a horizontal refracting linear Fresnel lens sheet for refracting a projection beam mainly in a horizontal direction wherein a ridge line of said horizontal refracting linear Fresnel lens sheet extends in a vertical direction, a vertical refracting linear Fresnel lens sheet for refracting a projection beam mainly in said vertical direction wherein a ridge line of said vertical refracting linear Fresnel lens sheet extends in said horizontal direction, and a light diffusing lenticular lens sheets which are arranged starting from a beam-projection side with said horizontal refracting linear Fresnel lens sheet followed by said vertical refracting linear Fresnel lens sheet and ending with said light diffusing lenticular lens sheet, wherein a focal distance of said horizontal refracting linear Fresnel lens sheet is made greater than a focal distance of said vertical refracting linear Fresnel lens sheet.

6. A projection screen according to claim 5 characterized in that said horizontal refracting linear Fresnel lens sheet forms a diverging system on an axis thereof.

7. A projection screen according to claim 6 characterized in that horizontal-direction radiation angles of projection beams having passed said horizontal refracting linear Fresnel lens sheet and said vertical refracting linear Fresnel lens sheet form a divergent system on a horizontal plane at a position where lens angles of lenses of said horizontal refracting linear Fresnel lens sheet are zeros, but form a convergent system at least either at an uppermost portion or at a lowermost portion of said projection screen where lens angles of lenses of said vertical refracting linear Fresnel lens sheet have maximum values.

8. A projection screen for rear-projection TV sets characterized in that said projection screen comprises three or more screen sheets: a horizontal refracting linear Fresnel lens sheet for refracting a projection beam mainly in a horizontal direction wherein a ridge line of said horizontal refracting linear Fresnel lens sheet extends in a vertical direction, a vertical refracting linear Fresnel lens sheet for refracting a projection beam mainly in said vertical direction wherein a ridge line of said vertical refracting linear Fresnel lens sheet extends in said horizontal direction, and a light diffusing lenticular lens sheet, which are arranged starting from a beam-projection side with said horizontal refracting linear Fresnel lens sheet followed by said vertical refracting linear Fresnel lens sheet and ending with said light diffusing lenticular lens sheet, wherein focal distances of said horizontal refracting linear Fresnel lens sheet and said vertical refracting linear Fresnel lens sheet are set at such values that, the greater the distance from a point to a center axis of a lens, the greater said focal distance for said point.

9. A projection screen according to claim 8 characterized in that said vertical refracting linear Fresnel lens sheet forms a converging system over its entire region, from a center to an outmost circumference thereof, whereas said horizontal refracting linear Fresnel lens sheet forms:

a converging system only in an area in close proximity to a center axis thereof;

a portion for converting radiated beams into parallel rays in a range of distances from a center of a lens thereof between a vertical-direction maximum center distance and a horizontal-direction maximum center distance of said horizontal refracting linear Fresnel lens sheet; and a diverging system on circumferences outside said portion.

10. A projection screen according to claim 8 characterized in that said vertical refracting linear Fresnel lens sheet includes an optical system common to a portion of said horizontal refracting linear Fresnel lens sheet wherein said portion includes at least a center of said horizontal refracting linear Fresnel lens sheet.

11. A projection screen for rear-projection TV sets characterized in that said projection screen comprises three or more screen sheets: a horizontal refracting linear Fresnel lens sheet for refracting a projection beam mainly in a horizontal direction wherein a ridge line of said horizontal refracting linear Fresnel lens sheet extends in a vertical direction, a vertical refracting linear Fresnel lens sheet for refracting a projection beam mainly in said vertical direction wherein a ridge line of said vertical refracting linear Fresnel lens sheet extends in said horizontal direction, and a light diffusing lenticular lens sheet, which are arranged starting from a beam-projection side with said horizontal refracting linear Fresnel lens sheet followed by said vertical refracting linear Fresnel lens sheet and ending with said light diffusing lenticular lens sheet, wherein a light diffusing means is provided on said vertical refracting linear Fresnel lens sheet.

12. A projection screen according to claim 11 characterized in that said vertical refracting linear Fresnel lens sheet comprises a base film and lenses made of ultraviolet-ray hardened resin and formed on said base film.

13. Projection screen according to claim 12 characterized in that said light diffusing means is a mat-processed surface created on a beam-incidence-surface side of said base film.

14. A projection screen according to claim 12 characterized in that said light diffusing means is a mat-processed surface created on a boundary between said base film and said ultraviolet-beam hardened resin.

15. A projection screen according to claim 12 characterized in that said light diffusing means is created by mixing a light diffusing substance in said base film.

16. A projection screen according to claim 12 characterized in that said light diffusing means is created by laminating a light diffusing film on said base film.

17. A projection screen according to claim 12 characterized in that said light diffusing means is a light diffusing layer coated on a surface of said base film.

18. A projection screen according to claim 12 characterized in that said light diffusing means is a combination of any two of:

a mat-processed surface created on a beam-incidence-surface side of said base film;

a mat-processed surface created on a boundary between said base film and said ultraviolet-beam hardened resin;

a film comprising a light diffusing substance mixed with said base film;

a light diffusing film laminated on said base film; and a light diffusing layer coated on a surface of said base film.

19. A projection screen according to claim 12 characterized in that said light diffusing means is microlenticular lenses created on a beam-incidence side of said vertical refracting linear Fresnel lens sheet in parallel to a group of lenses of said vertical refracting linear Fresnel lens sheet.

20. Projection screen according to claim 19 characterized in that a refraction index of said microlenticular lenses is equal to or smaller than a refraction index of a base film of said filmy sheet.

21. A projection screen for rear-projection TV sets characterized in that said projection screen comprises three or more screen sheets: a horizontal refracting linear Fresnel lens sheet for refracting a projection beam mainly in a horizontal direction wherein a ridge line of said horizontal refracting linear Fresnel lens sheet extends in a vertical direction, a vertical refracting linear Fresnel lens sheet for refracting a projection beam mainly in said vertical direction wherein a ridge line of said vertical refracting linear Fresnel lens sheet extends in said horizontal direction, and a light diffusing lenticular lens sheet, which are arranged starting from a beam-projection side with said horizontal refracting linear Fresnel lens sheet followed by said vertical refracting linear Fresnel lens sheet and ending with said light diffusing lenticular lens sheet, wherein vertical-direction diffusion angles are set at such values that, the greater the distance from a point to a center of said projection screen, the greater said vertical-direction diffusion angle at said point.

22. A projection screen according to claim 21 characterized in that microlenticular lenses for diffusing beams in a vertical direction are created on an incidence-surface side of either said horizontal refracting linear Fresnel lens sheet or said vertical refracting linear Fresnel lens sheet and vertical-direction diffusion angles of said microlenticular lenses are set at such values that, the greater the distance from a point to a center of said projection screen, the greater said vertical-direction diffusion angle at said point.

\* \* \* \* \*